US009426436B2

(12) United States Patent
Nakashin

(10) Patent No.: US 9,426,436 B2
(45) Date of Patent: *Aug. 23, 2016

(54) IMAGE PROCESSING DEVICE, PROJECTOR, AND METHOD OF CONTROLLING PROJECTOR

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/381,421

(22) PCT Filed: Mar. 19, 2013

(86) PCT No.: PCT/JP2013/001880
§ 371 (c)(1),
(2) Date: Aug. 27, 2014

(87) PCT Pub. No.: WO2013/140794
PCT Pub. Date: Sep. 26, 2013

(65) Prior Publication Data
US 2015/0103257 A1 Apr. 16, 2015

(30) Foreign Application Priority Data
Mar. 21, 2012 (JP) ................................. 2012-063282

(51) Int. Cl.
H04N 9/31 (2006.01)

(52) U.S. Cl.
CPC ........... H04N 9/3185 (2013.01); H04N 9/3194 (2013.01)

(58) Field of Classification Search
CPC ....................................................... H04N 9/31

USPC ......... 348/746, 341, 745, 744; 353/69, 70, 31
See application file for complete search history.

(56) References Cited

U.S. PATENT DOCUMENTS 5,532,765 A 7/1996 Inoue et al.
6,061,102 A 5/2000 Sheppard et al.
(Continued)

FOREIGN PATENT DOCUMENTS

EP 0 703 714 A2 3/1996
JP A-7-15692 1/1995
(Continued)

OTHER PUBLICATIONS

International Search Report issued in International Application No. PCT/JP2013/001880 mailed Jul. 30, 2013.
(Continued)

Primary Examiner — Paulos M Natnael
(74) Attorney, Agent, or Firm — Oliff PLC

(57) ABSTRACT

An image processing device used for a projector displays an image by projecting the image on a projection surface. A detection image generation section adapted to generate a detection image, which is an image adapted to detect a state of a projection image displayed on the projection surface, and includes a plurality of detection image parts is provided. Each of the detection image parts includes a plurality of regions having respective luminance values different from each other. The detection image generation section changes the luminance distribution of each of the detection image parts of the detection image to be generated so that the maximum luminance values of the detection image parts included in the taken detection image obtained by taking the detection image projected on the projection surface fall within an allowable range.

10 Claims, 16 Drawing Sheets

(56) References Cited

U.S. PATENT DOCUMENTS

| | | | |
|---|---|---|---|
| 6,198,542 B1 | 3/2001 | Tabata | |
| 6,292,171 B1 | 9/2001 | Fu et al. | |
| 7,016,058 B1 | 3/2006 | Tabata | |
| 7,274,382 B2 | 9/2007 | Plut | |
| 7,313,612 B1 | 12/2007 | Kakimoto | |
| 7,347,564 B2* | 3/2008 | Matsumoto | G06T 3/0006 345/647 |
| 7,893,393 B2 | 2/2011 | Webb et al. | |
| 8,529,069 B2* | 9/2013 | Oka | H04N 9/3185 348/745 |
| 8,804,504 B1* | 8/2014 | Chen | H04L 69/324 370/229 |
| 8,807,762 B2* | 8/2014 | Uchiyama | G03B 21/00 345/589 |
| 8,928,554 B2* | 1/2015 | Hine | B65G 15/00 345/1.3 |
| 9,122,138 B2* | 9/2015 | Furui | G03B 21/147 |
| 2002/0044275 A1 | 4/2002 | Kitabayashi et al. | |
| 2002/0108108 A1 | 8/2002 | Akaiwa et al. | |
| 2004/0201825 A1* | 10/2004 | Kobayashi | H04N 5/74 353/70 |
| 2007/0132893 A1* | 6/2007 | Miyazawa | H04N 9/3182 348/745 |
| 2007/0177037 A1* | 8/2007 | Kurata | H04N 5/23248 348/241 |
| 2008/0100806 A1* | 5/2008 | Inazumi | G03B 21/14 353/31 |
| 2008/0147912 A1 | 6/2008 | Akaiwa et al. | |
| 2008/0234843 A1 | 9/2008 | Akaiwa et al. | |
| 2010/0309210 A1 | 12/2010 | Akaiwa et al. | |
| 2011/0150356 A1 | 6/2011 | Jo et al. | |
| 2011/0210977 A1 | 9/2011 | Akaiwa et al. | |
| 2012/0128224 A1* | 5/2012 | Yu | G06T 5/002 382/131 |
| 2013/0077869 A1* | 3/2013 | Teshima | G06T 11/001 382/195 |
| 2013/0222409 A1 | 8/2013 | Akaiwa et al. | |
| 2013/0235212 A1* | 9/2013 | Nakashin | H04N 17/00 348/177 |
| 2014/0115027 A1 | 4/2014 | Akaiwa et al. | |
| 2014/0168525 A1 | 6/2014 | Hasegawa et al. | |

FOREIGN PATENT DOCUMENTS

| | | |
|---|---|---|
| JP | H09-198206 A | 7/1997 |
| JP | 2001-175576 A | 6/2001 |
| JP | 2001-255974 A | 9/2001 |
| JP | 2002-057964 A | 2/2002 |
| JP | A-2005-159426 | 6/2005 |
| JP | 2006-060447 A | 3/2006 |
| JP | 2007-166271 A | 6/2007 |
| JP | A-2011-176629 | 9/2011 |
| WO | 2013024705 A1 | 2/2013 |

OTHER PUBLICATIONS

Jul. 30, 2013 International Search Report issued in International Patent Application No. PCT/JP2013/001881.
Oct. 29, 2015 Office Action issued in U.S. Appl. No. 14/381,345.
May 23, 2016 Office Action issued in U.S. Appl. No. 14/381,345.

* cited by examiner (A)

- IMAGING(S30)
- CORRECTION OF DETECTION IMAGE (S60b, S50)
- REPROJECTION OF DETECTION IMAGE (S20)

(B)

DETECTION IMAGE

IMAGING RESULT

EXAMPLE OF CORRECTION CONCEPT

EXAMPLE OF CORRECTION

IMAGING RESULT AFTER CORRECTION

|  | UPPER LEFT | UPPER RIGHT | LOWER LEFT | LOWER RIGHT |
|---|---|---|---|---|
| LUMINANCE VALUE OF EACH DOT PATTERN | Vsdp1=75% | Vsdp2=60% | Vsdp3=100% | Vsdp4=80% |
| PROPORTION TO MINIMUM VALUE | K1=80% | K2=100% | K3=60% | K4=75% |
| CORRECTION VALUE | C1=80% | C2=100% | C3=60% | C4=80% |

| DOT PATTERN POSITION | PROPORTION OF LUMINANCE VALUE | | SUM OF SHIFT AMOUNT OF CENTROID COORDINATE (PIXELS) | | STANDARD DEVIATION σ OF CENTROID COORDINATE (PIXELS) | |
|---|---|---|---|---|---|---|
| | BEFORE CORRECTION | AFTER CORRECTION | BEFORE CORRECTION | AFTER CORRECTION | BEFORE CORRECTION | AFTER CORRECTION |
| UPPER LEFT DP1 | 65% | 100% | 7.383 | 1.556 | 0.201 | 0.035 |
| UPPER RIGHT DP2 | 77% | 92% | 2.317 | 1.580 | 0.042 | 0.044 |
| LOWER LEFT DP3 | 87% | 100% | 2.493 | 1.479 | 0.035 | 0.027 |
| LOWER RIGHT DP4 | 100% | 90% | 1.663 | 1.701 | 0.026 | 0.036 |

IMAGE PROCESSING DEVICE, PROJECTOR, AND METHOD OF CONTROLLING PROJECTOR

CROSS REFERENCE TO RELATED APPLICATIONS

The entire disclosure of Japanese Patent Application No. 2012-063282, filed Mar. 21, 2012 is expressly incorporated by reference herein.

TECHNICAL FIELD

The present invention relates to a projector for displaying an image by projecting the image on a projection surface.

BACKGROUND ART

In the case of displaying an image by projecting the image on a projection surface such as a screen using a projector, an adjustment corresponding to a relative positional relationship between the projector and the projection surface is generally performed. As such an adjustment, there can be cited a focus adjustment for adjusting the shift of the focus of the image (hereinafter also referred to as a "projection image") projected on the projection surface, a keystone correction for correcting the distortion (hereinafter also referred to as a "keystone distortion") of the image range of the projection image, and so on.

The focus adjustment and the keystone correction described above are performed by taking an image of a test pattern projected on the projection surface with a camera installed in the projector, and then obtaining the information necessary for the focus adjustment and the keystone correction based on the image (hereinafter also referred to as a "taken image") thus taken (see PTL 1 and PTL 2).

In PTL 1, the operation is as simply explained below. Specifically, the light with even luminance is projected from the projector toward the screen, the reflected light from the screen is received, and the centroid position of the illuminance of the received light is detected. Then, the tilt angle of the screen is calculated based on the centroid position thus detected, and then the keystone distortion is corrected in accordance with the tilt angle thus calculated.

In PTL 2, the operation is as simply explained below. Specifically, focusing attention to four sides (upper, lower, right, and left sides) of the screen in the image taken by the imaging section, the ratios between the lengths of the two sides opposed to each other, namely the upper and lower sides and the right and left sides, are calculated. The ratio between the intensities of the lights respectively projected on the upper and lower areas is calculated based on the ratio between the upper and lower sides, and similarly, the ratio between the intensities of the lights respectively projected on the right and left areas is calculated based on the ratio between the right and left sides. Then, the test pattern based on the ratios of the light intensities is projected.

CITATION LIST

Patent Literature

[PTL 1]
JP-A-2005-159426
[PTL 2]
JP-A-2011-176629

SUMMARY OF INVENTION

Technical Problem

However, in PTL 1 mentioned above, there arise a problem that the detection accuracy of the reflected light might drop depending on the positional relationship between the projector and the screen, a problem that the detection accuracy of the reflected light is significantly different between the locations, and so on. For example, in the case in which the screen is tilted, since the light intensity decreases in inverse proportion to the square of the distance from the light source, the longer the distance (hereinafter also referred to as a "projection distance") of the light projected by the projector to the screen becomes, the more saliently the drop of the illuminance of the reflected light received from the screen grows, and the more dramatic drop of the accuracy of the reflected light received results. Therefore, the sharper the tilt becomes, the more significant the drop of the illuminance of the reflected light received corresponding to the light with longer projection distance is, and the accuracy of the reflected light received drops to cause the calculation accuracy of the centroid position to drop as a result. Further, in some cases, the angle of the projection with respect to the screen is different even if the projection distance is the same, and there is a possibility of failing to detect the difference accurately.

Further, PTL 2 mentioned above is premised on the concept that the light intensity variation between the two sides opposed to each other is a gradational variation based on the ratio between the lengths of the sides. However, according to the verification with an actual measurement test, it is confirmed that the gradational variation might fail to occur in some cases. It is possible that generation of the light intensity variation due to the contamination in the projection surface of the screen, the distortion of the screen, and so on is the factor thereof. Further, if the gradational variation based on the ratio between the lengths of the sides fails to occur as described above, there arises a problem that degradation of the detection accuracy of the test pattern is incurred. Further, PTL 2 is premised on the fact that the imaging section is integrated with the projector, and in the case of the separate imaging section not installed in the projector, the error between the positional relationship between the projector and the screen and the positional relationship between the imaging section and the screen is accumulated, and there arises a problem that the possibility of incurring the degradation of the detection accuracy of the test pattern rises.

Solution to Problem

An advantage of some aspects of the invention is to provide a technology of further improving the detection accuracy of the detection image projected on the projection surface compared to the related art.

The invention can be implemented as the following forms or application examples.

Application Example 1

This application example is directed to an image processing device used for a projector adapted to display an image by projecting the image on a projection surface, and including a detection image generation section adapted to generate a detection image, which is an image adapted to detect a state of a projection image displayed on the projection surface, and includes a plurality of detection image parts, each of the detection image parts includes a plurality of regions having respective luminance values different from each other, and the detection image generation section changes a luminance distribution of each of the detection image parts of the detection image to be generated so that maximum luminance values of the detection image parts included in a taken detection image obtained by imaging fall within an allowable range. In this image processing device, since the detection image part is formed as an image including a plurality of regions having respective luminance values different from each other, and luminance distribution of each of the detection image parts of the detection image to be generated is changed so that the maximum luminance values of the detection image parts included in the taken detection image fall within the allowable range, it is possible to perform the adjustment so that the luminance values of the detection image parts included in the taken detection image become roughly equal to each other. Thus, it is possible to improve the detection accuracy of the centroid coordinate of each of the detection image parts included in the taken detection image, and it becomes possible to improve the detection accuracy of the detection image.

Application Example 2

This application example is directed to the image processing device according to Application Example 1, wherein the detection image generation section takes the luminance value of either one of the taken detection image parts out of the detection image parts included in the taken detection image as a reference luminance value, and changes the luminance distribution of each of the detection image parts of the detection image to be generated so that the maximum luminance values of the detection image parts included in the taken detection image are roughly equal to each other based on a relationship between the reference luminance value and luminance values of other detection image parts. In this image processing device, the detection image generation section is capable of changing the luminance distribution of each of the detection image parts of the detection image to be generated so that the luminance values of the detection image parts included in the taken detection image obtained by imaging fall within the allowable range. Thus, it is possible to improve the detection accuracy of the centroid coordinate of each of the detection image parts included in the taken detection image, and it becomes possible to improve the detection accuracy of the detection image.

Application Example 3

This application example is directed to the image processing device according to Application Example 1 or 2, wherein the detection image generation section changes the luminance distribution of each of the detection image parts of the detection image to be generated by changing at least one of an overall size of the detection image part included in the detection image, a width of each of the regions included in the detection image part, and the maximum luminance value of the detection image part.

In this image processing device, by changing at least one of the overall size of the detection image part, the width of each of the regions included in the detection image part, and the maximum luminance value of the detection image part, the luminance distribution of each of the detection image parts of the detection image to be generated can be changed. Thus, it is possible to improve the detection accuracy of the centroid coordinate of each of the detection image parts included in the taken detection image, and it becomes possible to improve the detection accuracy of the detection image.

Application Example 4

This application example is directed to the image processing device according to any one of Application Examples 1 through 3, wherein sectioning of the regions is obtained based on a predetermined function.

Application Example 5

This application example is directed to the image processing device according to Application example 4, wherein the function is a Gaussian distribution function. In the image processing device according to one of the application examples 4 and 5, it is possible to easily form the plurality of detection image parts included in the detection image as the detection image parts with the luminance distribution suitable for the detection of the centroid coordinate of each of the detection image parts.

Application Example 6

This application example is directed to the image processing device according to any one of Application Examples 1 through 5, wherein a projection image adjustment section adapted to adjust image quality of the projection image is further provided, and the projection image adjustment section performs at least one of a plurality of image quality adjustments including a focus adjustment and a keystone distortion correction of the projection image based on the process using the detection image.

In the image processing device according to the application example 6, the accurate image quality adjustment can be performed based on the process using the detection image with improved accuracy.

Application Example 7

This application example is directed to a projector adapted to display an image by projecting the image on a projection surface, and including the image processing device according to any one of Application Examples 1 through 6, an imaging section adapted to take the detection image projected on the projection surface, and a projection section adapted to project the image based on image data output from the image processing device.

Application Example 8

This application example is directed to a method of controlling a projector adapted to display an image by projecting the image on a projection surface, and including (a) generating a detection image, which is an image adapted to detect a state of a projection image displayed on the projection surface, and includes a plurality of detection image parts, and (b) projecting the detection image on the projection surface, each of the detection image parts includes a plurality of regions having respective luminance values different from each other, and in step (a), a luminance distribution of each of the detection image parts of the detection image to be generated is changed so that maximum luminance values of the detection image parts included in a taken detection image obtained by taking the detection image projected on the projection surface fall within an allowable range. In this method of controlling a projector, since the detection image part is formed as an image including a plurality of regions having respective luminance values different from each other, and luminance distribution of each of the detection image parts of the detection image to be generated is changed so that the maximum luminance values of the detection image parts included in the taken detection image fall within the allowable range, it is possible to perform the adjustment so that the luminance values of the detection image parts included in the taken detection image become roughly equal to each other. Thus, it is possible to improve the detection accuracy of the centroid coordinate of each of the detection image parts included in the taken detection image, and it becomes possible to improve the detection accuracy of the detection image.

It should be noted that the invention can be put into practice in a variety of aspects such as an image display device, a projector, a method of controlling a projector, a computer program for controlling the projector, or a storage medium storing the computer program.

DESCRIPTION OF EMBODIMENTS

A. Configuration of Projector

Figure 1:
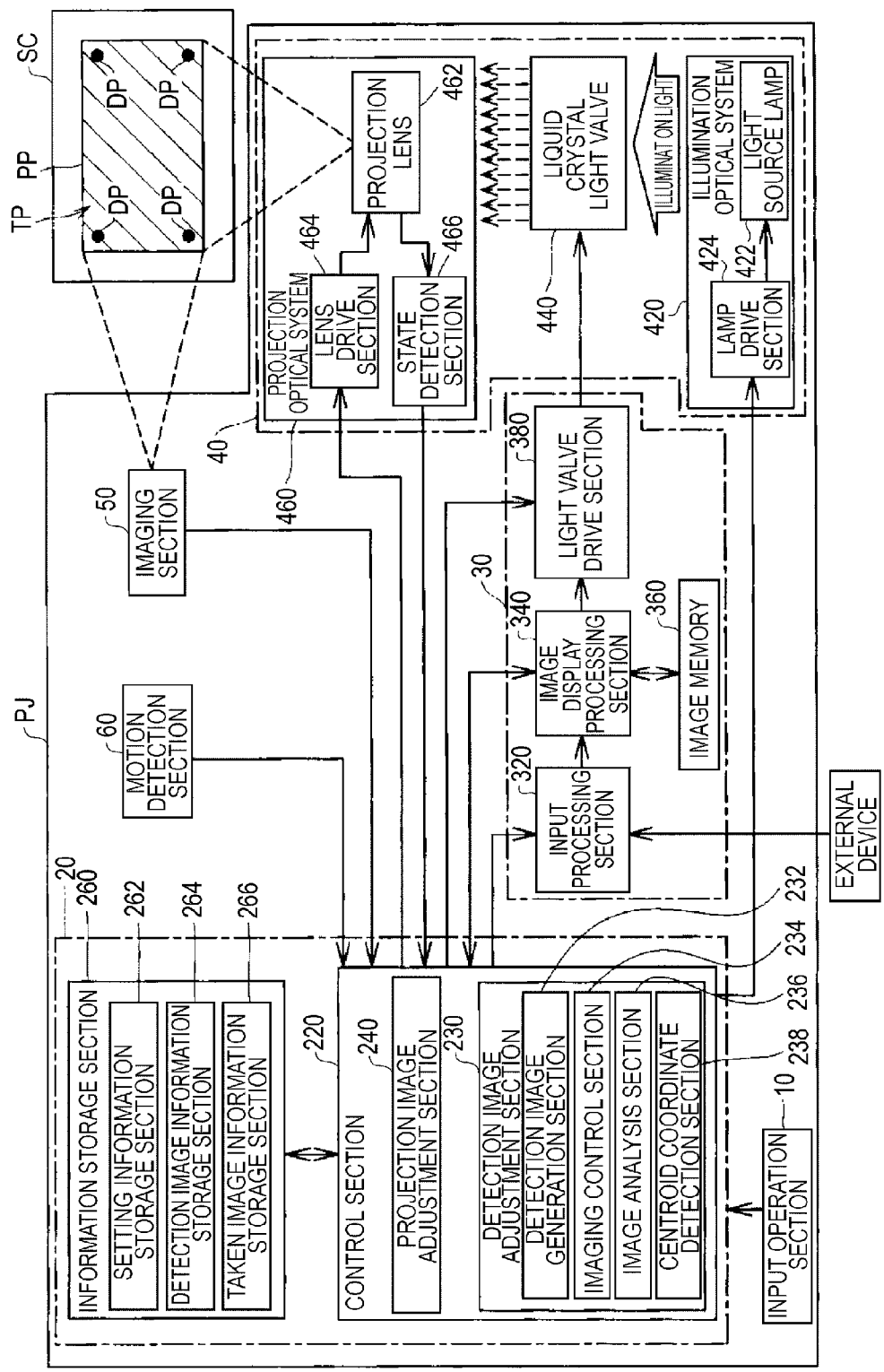
FIG. 1 is a block diagram schematically showing a configuration of a projector as an embodiment of the invention.

FIG. 1 is a block diagram schematically showing a configuration of a projector as an embodiment of the invention. The projector PJ is provided with an input operation section 10, a control circuit 20, an image processing operation circuit 30, an image projection optical system 40 (projection section), an imaging section 50, and a motion detection section 60.

The input operation section 10 is composed of, for example, a remote controller, and buttons and keys provided to the projector PJ, wherein the buttons and the keys are not shown in the drawing. The input operation section 10 outputs instruction information corresponding to the operation by the user to the control circuit 20. For example, the instruction information of starting a detection image adjustment process described later is output from the user to the control circuit 20.

The image projection optical system 40 generates image light representing an image, and then images the image light on a screen (a projection surface) SC to thereby project the image in an enlarged manner. The image projection optical system 40 is provided with an illumination optical system 420, a liquid crystal light valve 440, and a projection optical system 460.

The illumination optical system 420 is provided with a light source lamp 422 and a lamp drive section 424. As the light source lamp 422, a variety of types of self-luminescent elements such as a discharge emission light source lamp including, for example, a super-high pressure mercury lamp and a metal halide lamp, a laser source, a light-emitting diode, or an organic electro luminescence (EL) element can be used. The lamp drive section 424 drives the light source lamp 422 based on the control by the control circuit 20.

The liquid crystal light valve 440 is a light modulation device for modulating the light emitted from the illumination optical system 420 based on the image data. The liquid crystal light valve 440 is formed of a transmissive liquid crystal panel having a plurality of pixels arranged in a matrix. By controlling the operation of the liquid crystal of each pixel based on a drive signal from a light valve drive section 380 of the image processing operation circuit 30 described later, the liquid crystal light valve 440 converts the illumination light emitted from the illumination optical system 420 into the image light representing the image. It should be noted that in the present embodiment the liquid crystal light valve 440 includes three liquid crystal light valves (not shown) for three color components of red (R), green (G), and blue (B). It should be noted that it is also possible to project a monochrome image using a single liquid crystal light valve.

The projection optical system 460 images the image light emitted from the liquid crystal light valve 440 on the screen SC to thereby project the image on the screen SC in an enlarged manner. The projection optical system 460 is provided with a projection lens 462, a lens drive section 464, and a state detection section 466. The projection lens 462 has a focusing lens for focus adjustment and a zoom lens for zoom adjustment, which are not shown in the drawing, and are configured so as to move in the optical axis direction, and enlarges the image light emitted from the liquid crystal light valve 440 in accordance with the zoom position of the zoom lens, and then images the image light in accordance with the focus position of the focusing lens to thereby project the image represented by the image light on the screen SC in an enlarged manner. The lens drive section 464 changes the position (hereinafter referred to as a "focus position") in the optical axis direction of the focusing lens based on the control by the control circuit 20. Further, the lens drive section 464 changes the position (hereinafter referred to as a "zoom position") in the optical axis direction of the zoom lens. The state detection section 466 detects the focus position of the focusing lens and the zoom position of the zoom lens. It should be noted that since the projection optical system 460 has a typical configuration, the graphical description and the explanation of the specific configuration will be omitted.

The image processing operation circuit 30 is provided with an input processing section 320, an image display processing section 340, an image memory 360, and the light valve drive section 380. Based on the control by the control circuit 20, the input processing section 320 performs A/D conversion on the input image signal supplied from the external device, if necessary, to thereby convert it into a digital image signal, which can be processed by the image display processing section 340. Based on the control by the control circuit 20, the image display processing section 340 writes the image data, which is included in the digital image signal output from the input processing section 320, into the image memory 360 frame by frame, and then performs various image processing such as a resolution conversion process or keystone correction process when reading it out therefrom. Further, the image display processing section 340 superimposes detection image data representing the detection image output from a control section 220 on the image data. The light valve drive section 380 drives the liquid crystal light valve 440 with the digital image signal input from the image display processing section 340. It should be noted that it is also possible to arrange that the light valve drive section 380 is provided to the image projection optical system 40, but not to the image processing operation circuit 30.

Based on the control by the control circuit 20, the imaging section 50 takes a projection image, and then outputs the image signal corresponding to the image thus taken to the control circuit 20. The projection image is an image obtained by superimposing the detection image TP (composed of four dot patterns DP as four detection image parts) on the image PP (indicated by hatching) represented by the digital image signal input from the input processing section 320 to the image display processing section 340 as the detection image, and is projected on the screen SC in an enlarged manner. The imaging section 50 is configured using, for example, a CCD camera provided with charge coupled device (CCD) as an imaging element. It should be noted that the detection image will be described later.

The motion detection section 60 detects motions around the projection axis, in a vertical direction and a horizontal direction, and stoppage of the motions in the projector PJ. It should be noted that the motion detection section can be configured using a variety of sensors capable of detecting the motions and the stoppage of the motions, such as an angular velocity sensor, an acceleration sensor, or a gyro sensor.

The control circuit 20 is a computer provided with a CPU, a ROM, and a RAM, and executes a control program to thereby constitute the control section 220 and an information storage section 260. The control section 220 functions as a variety of control function sections for respectively controlling the image processing operation circuit 30, the image projection optical system 40, the imaging section 50, and the motion detection section 60 with the control program thus executed. The information storage section 260 functions as a variety of storage sections for storing the information for the respective control operations. As examples of the control function sections of the control section 220, FIG. 1 shows a detection image adjustment section 230 for performing a detection image adjustment described later, and a projection image adjustment section 240 for performing the adjustment of the image quality of the projection image such as the focus adjustment and the keystone correction (keystone distortion correction). The detection image adjustment section 230 operates by executing the corresponding program in response to the instruction of starting the detection image adjustment input by the user with the input operation section 10. Further, as examples of the storage sections of the information storage section 260, FIG. 1 shows a setting information storage section 262 for storing setting information used for various control operations by the control section 220, a detection image information storage section 264 for storing detection image information described later, and a taken image information storage section 266 for storing the image data of the taken image taken by the imaging section 50.

The detection image adjustment section 230 is provided with a detection image generation section 232, an imaging control section 234, an image analysis section 236, and a centroid coordinate detection section 238. The detection image generation section 232 generates the image data of the detection image used for the focus adjustment and the keystone correction. The imaging control section 234 controls the imaging section 50 to take the projection image including the detection image projected on the screen SC, and then stores the projection image (hereinafter also referred to as a "taken image") thus taken into the taken image information storage section 266. The image analysis section 236 analyzes the taken image. It should be noted that the image analysis section 236 can be disposed in the detection image generation section 232. As described later, the centroid coordinate detection section 238 detects the centroid coordinate used for the image quality adjustment such as the focus adjustment and the keystone correction performed by the projection image adjustment section 240. The detection image adjustment section 230 will further be described later.

It should be noted that in the present embodiment the detection image generation section 232 and the image analysis section 236 correspond to a detection image generation section according to the invention. Further, the control circuit 20 and the image processing operation circuit 30 correspond to an image processing device according to the invention.

B. Operation of Projector

Operational Explanation of Detection Image Adjustment

Figure 2:
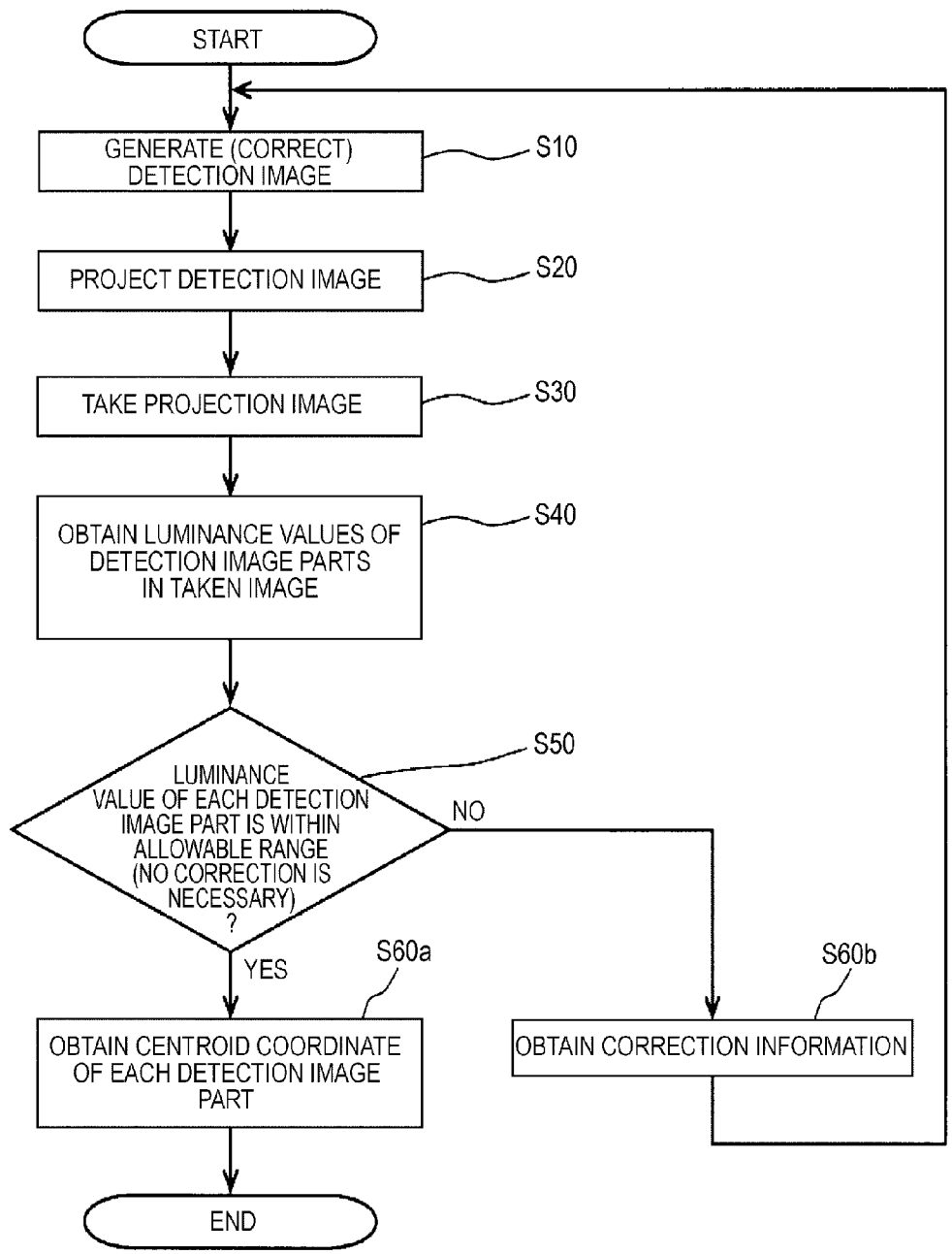
FIG. 2 is a flowchart showing a detection image adjustment process in the embodiment.

FIG. 2 is a flowchart showing a detection image adjustment process in the present embodiment. When the detection image adjustment section 230 (FIG. 1) of the control section 220 starts the detection image adjustment process, the detection image generation section 232 of the detection image adjustment section 230 generates the detection image (step S10). The image data (hereinafter also referred to as "detection image data") of the detection image thus generated is output to the image display processing section 340 (FIG. 1) of the image processing operation circuit 30.

Figure 3A:
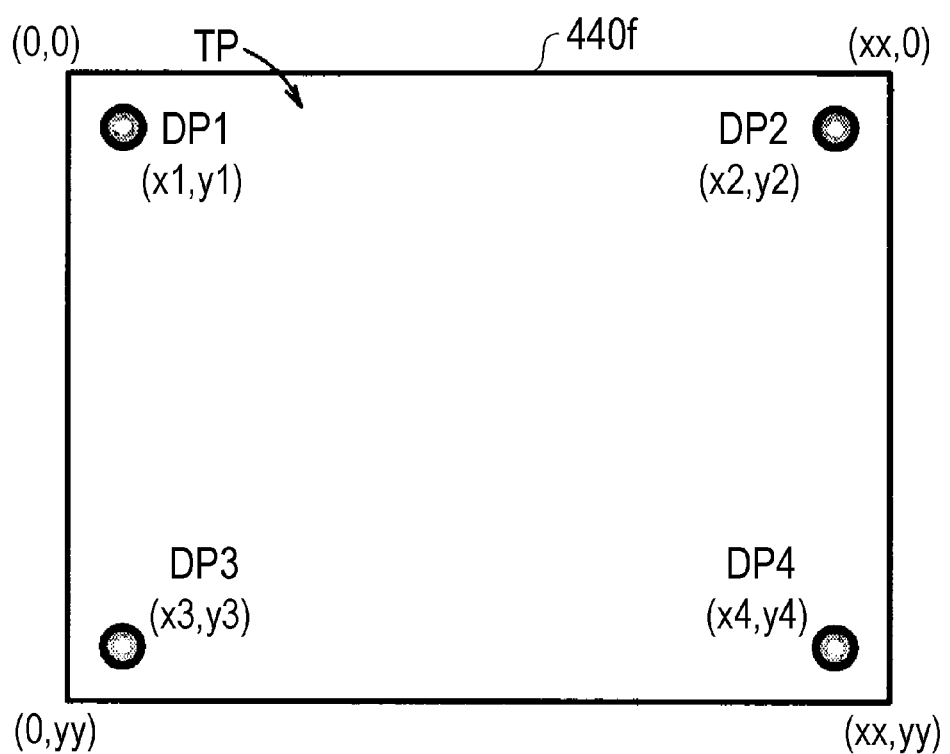
FIG. 3 is an explanatory diagram showing the detection image generated.
FIG. 3B is an explanatory diagrams showing the detection image generated.
Figure 3B:
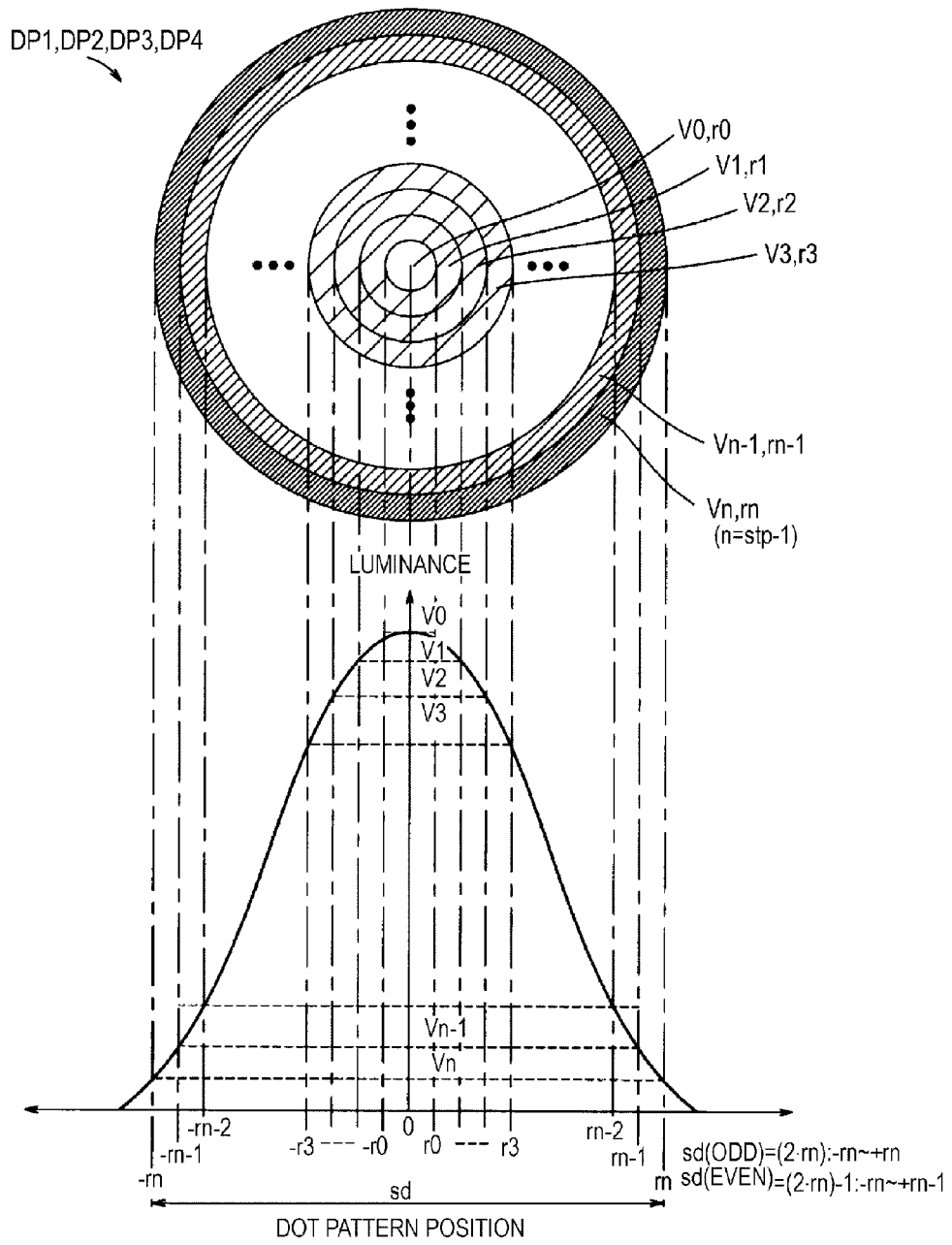

FIGS. 3A and 3B are explanatory diagrams showing the detection image generated. As shown in FIG. 3A, the detection image TP is composed of dot patterns DP1 through DP4 as the four detection image parts to be disposed at predetermined positions in the four corners of an image formation area 440f composed of the plurality of pixels (liquid crystal pixels), arranged in a matrix, of the liquid crystal light valve 440. It is assumed that the coordinates (in the horizontal and vertical directions) of the four vertexes located upper left, upper right, lower left, and lower right of the image formation area 440f are represented by (0, 0), (xx, 0), (0, yy), and (xx, yy), respectively. In this case, it is assumed that the four dot patterns DP1 through DP4 have the respective centers (centroids) disposed at predetermined coordinates (x1, y1), (x2, y2), (x3, y3), and (x4, y4) in the coordinate system of the image formation area 440f.

As shown in FIG. 3B, the dot patterns DP1 through DP4 are each a circular pattern with a dot pattern size (the diameter) equal to sd (the unit is, for example, [pixels]), sectioned into a plurality of levels of regions, wherein the number of gray levels is stp (stp is an integer equal to or greater than 3), varying outward from the center thereof, and each have a multilevel luminance distribution in which the luminance sequentially decreases in a direction from a central region toward an outer region. In the example shown in FIG. 3B, the luminance distribution has a shape emulating the Gaussian distribution. It should be noted that it is assumed that a number n of each of the regions is sequentially assigned as 0 through stp−1 in a direction from the center toward the outside. The number of the region (the center region) with a first level is n=0, and the luminance value (e.g., an 8 bit gray-scale value) thereof is represented by V0, and the radius thereof is represented by r0 (the unit is, for example, [pixels]). Similarly, the number of the region with a second level is n=1, and the luminance value thereof is represented by V1, and the radius thereof is represented by r1 [pixels]. Further, the number of the region with a third level is n=2, and the luminance value thereof is represented by V2, and the radius thereof is represented by r2 [pixels]. Therefore, the number of the region with an n-th level is n=0 through stp−1, and the luminance value thereof is represented by Vn, and the radius thereof is represented by rn [pixels]. It should be noted that in the case in which the number of pixels [pixels] is odd, the size sd of the dot pattern is expressed as sd=(2rn) in a range of −rn through +rn defining the center as 0. In contrast, in the case in which the number of pixels is even, the size sd of the dot pattern is expressed as sd=(2rn)−1 in a range of −rn through +(rn−1), or a range of −(rn−1) through +rn. It should be noted that a method of generating each of the dot patterns DP1 through DP4 constituting the detection image TP will further be described in detail.

Here, the reason of using such dot patterns as shown in FIG. 3B is that the dot patterns are suitable to accurately determine the centroid coordinate in the process of obtaining the centroid coordinate of each of the dot patterns. It should be noted that the process of obtaining the centroid coordinate will be described later.

After the generation of the detection image in the step S10 described above, the steps S20 through S60b are executed, and then the process returns to the step S10 to perform the process in the step S10 and the subsequent steps again. Thus, the detection image adjustment is performed. Hereinafter, prior to the specific explanation of the process on and after the step S20, an outline of the detection image adjustment using the detection image generated in the step S10 will firstly be explained.

Figure 4:
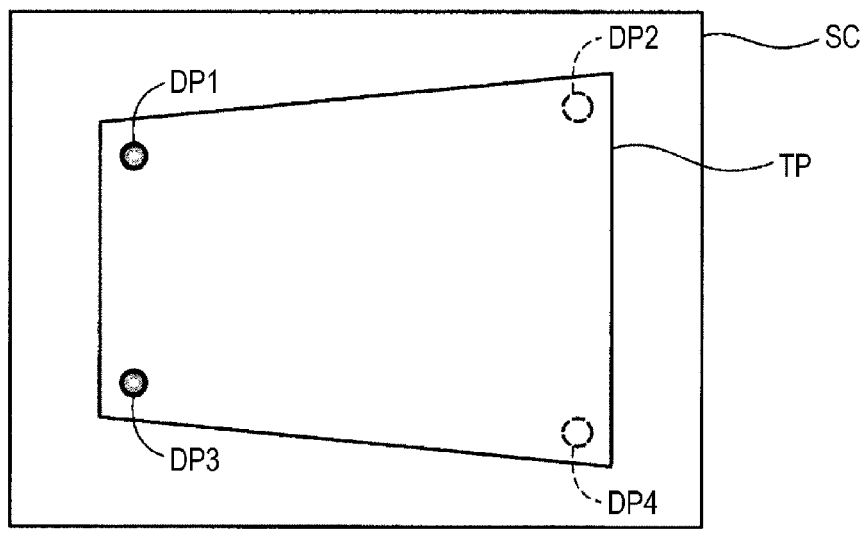
FIG. 4 illustrates explanatory diagrams showing an outline of a detection image adjustment process performed using the detection image generated in the step S10 shown in FIG. 2.
Figure 4:
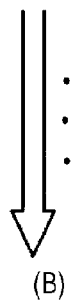
Figure 4:
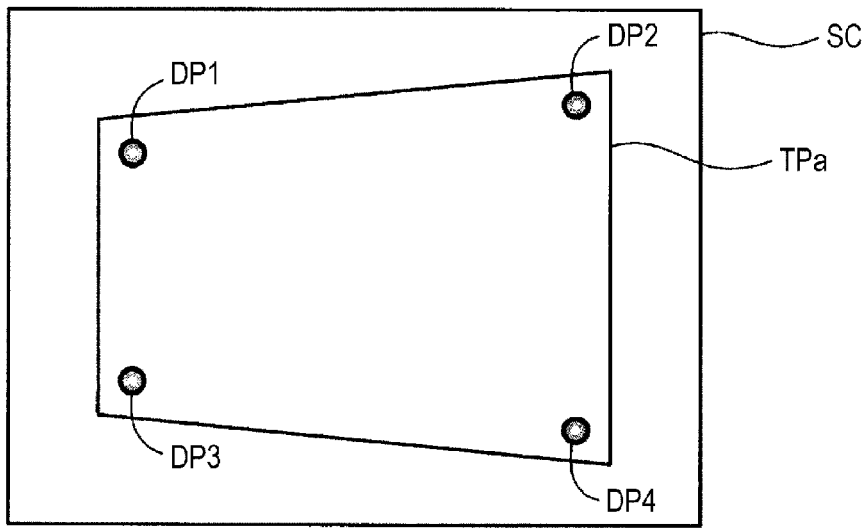

FIG. 4 illustrates explanatory diagrams showing an outline of a detection image adjustment process performed using the detection image generated in the step S10 shown in FIG. 2. The detection image TP generated in the step S10 is displayed by projection on the screen SC as shown in, for example, (A) in FIG. 4 in the step S20 described later. On this occasion, it is assumed that the detection image TP displayed by projection is in the state in which the luminance of the dot patterns DP2, DP4 located at upper right and lower right positions is lower than the luminance of the dot patterns DP1, DP3 located at the upper left and lower left positions. In this case, imaging of the projection image in the step S30 described later and correction of the detection image in the steps S60b, S10 are performed. As a result, as shown in (B) in FIG. 4, in the detection image TPa displayed by projection due to reprojection of the detection image after the correction in the step S20, the adjustment is performed so that the luminance values of the respective detection image parts DP1 through DP4 become roughly equal to each other.

Then, each of the processes performed on and after the step S20 shown in FIG. 2 will be explained. In the step S20, the detection image TP represented by the detection image data output from the detection image generation section 232 of the detection image adjustment section 230 to the image display processing section 340 is superimposed on an image represented by image data output from the input processing section 320 of the image processing operation circuit 30 to the image display processing section 340, and then displayed by projection on the screen SC via the light valve drive section 380 and the image projection optical system 40 (FIG. 1). Then, in the step S30, the imaging control section 234 (FIG. 1) of the detection image adjustment section 230 controls the imaging section 50 to take the projection image including the detection image and displayed by projection on the screen SC, and thus the image data (also referred to as "taken image data") of the taken image is acquired, and is then stored in the taken image information storage section 266.

In the step S40, the image analysis section 236 (FIG. 1) of the detection image adjustment section 230 obtains the luminance of each of the detection image parts (hereinafter also referred to as "taken detection image parts") in the taken image represented by the taken image data, the detection image parts corresponding to the dot patterns (the detection image parts) DP1 through DP4 constituting the detection image TP. Specifically, since approximate positions where the detection image parts respectively corresponding to the dot patterns DP1 through DP4 must exist can be identified in, for example, the taken image, the maximum luminance value of the pixels within the approximate range including each of the detection image parts is detected, and then the maximum luminance value thus detected is determined as the luminance of the corresponding one of the detection image parts.

In the step S50, the image analysis section 236 judges whether or not all of the luminance values (the maximum luminance values) of the detection image parts in the taken image are within the allowable range to thereby determine the necessity of the correction of the detection image. Specifically, the judgment can be achieved by determining whether or not all of the maximum luminance values of the detection image parts in the taken image are within the range of 230 through 250 in an 8-bit gray-scale (90 through 98% in the expression with the proportion to the maximum gray-scale value 255). It should be noted that the range is nothing more than an exemplification, but is not necessarily limited thereto, and is sufficiently set to a range corresponding to the required adjustment accuracy.

If all of the luminance values (the maximum luminance values) of the respective detection image parts in the taken image thus obtained are within the allowable range, and therefore, it is determined that the correction of the detection image is unnecessary (YES in the step S50), the centroid coordinate detection section 238 (FIG. 1) of the detection image adjustment section 230 obtains the centroid coordinates of the respective detection image parts in the taken image corresponding to the dot patterns DP1 through DP4 as the detection image parts constituting the detection image TP in the step S60a. Then, based on the centroid coordinates thus obtained here, various adjustments such as the focus adjustment and the keystone correction are further performed. It should be noted that the method of obtaining the centroid coordinates will be explained later.

If any one of the luminance values (the maximum luminance values) of the respective detection image parts in the taken image thus obtained is outside the allowable range, and therefore it is determined that the correction of the detection image is necessary (NO in the step S50), the detection image generation section 232 obtains the correction information for correcting the detection image TP in the step S60b. Then, the process returns to the step S10, the detection image is corrected based on the correction information thus obtained, the image data of the detection image thus corrected is output to the image display processing section 340, and then the process of the steps S10 through S60b is repeated until it is determined in the step S50 that the correction of the detection image is unnecessary. It should be noted that the process (step S60b) of obtaining the correction information will be explained later.

As explained hereinabove, in the detection image adjustment process, the adjustment of the detection image is performed so that the luminance values of the respective detection image parts in the taken image become roughly equal to each other.

Method of Generating Detection Image

Figure 5:
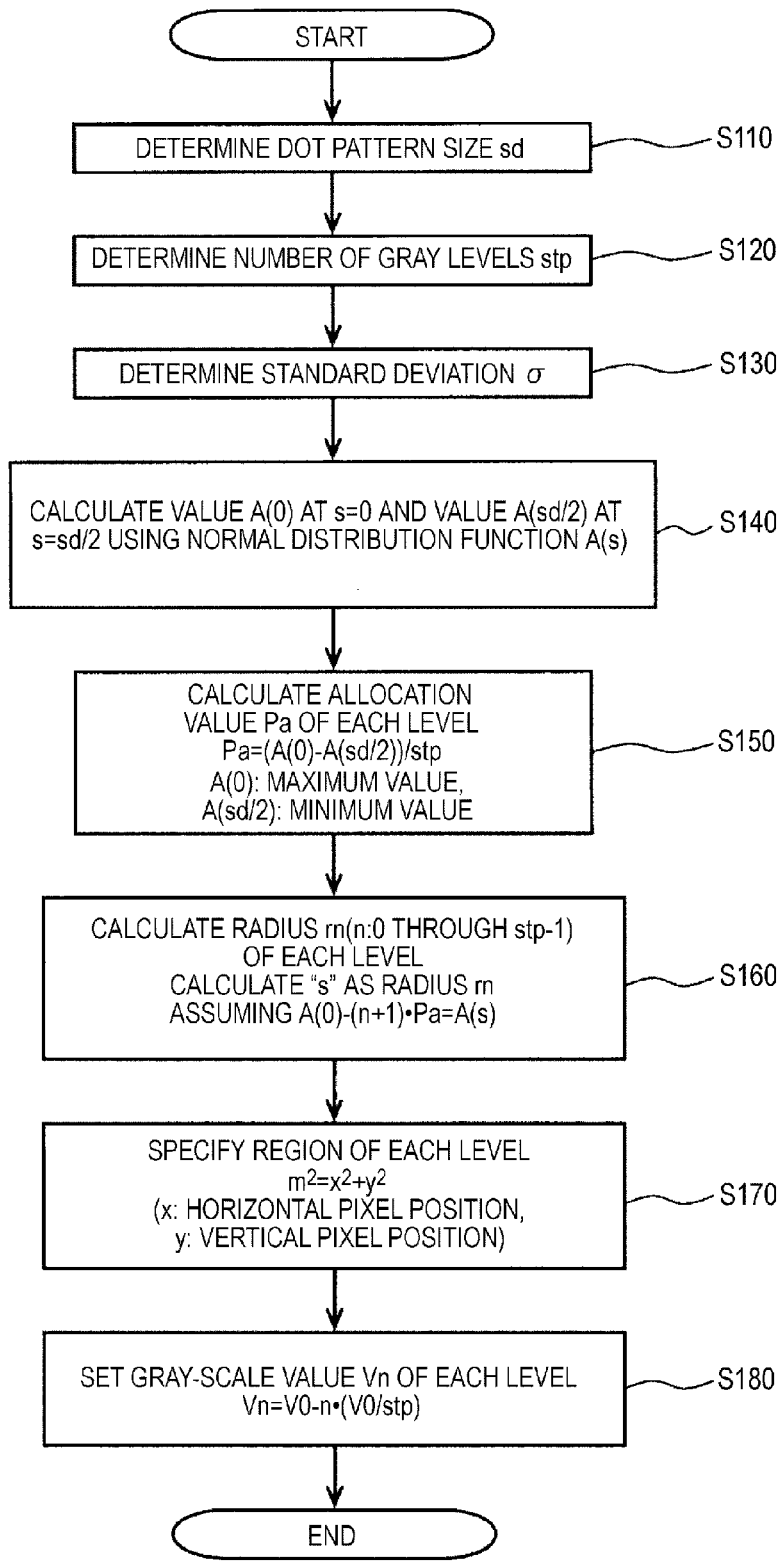
FIG. 5 is a flowchart showing a procedure of generating dot patterns as detection image parts constituting the detection image in the step S10 shown in FIG. 2.

FIG. 5 is a flowchart showing a procedure of generating the dot patterns as the detection image parts constituting the detection image in the step S10 shown in FIG. 2. Firstly, determination of the dot pattern size sd (step S110), determination of the number of gray levels stp of the luminance (step S120), and determination of the standard deviation sigma (step S130) are performed. It should be noted that at the beginning of the detection image adjustment, these parameters sd, stp, and sigma are set to values determined in advance. In the explanation below, it is assumed that sd=34 [pixels], stp=10 [levels], and sigma=10 [pixels] are set, as an example of the initial setting values.

Then, the values of the probability density A(0), A(sd/2) in s=0, and s=sd/2, respectively, are calculated (step S140) from the normal distribution function A(s) expressed by the formula (1) below, and then an allocation value Pa for each of the levels of the number of gray levels stp is calculated (step S150) from the allocation formula of the formula (2) below.

[Math. 1]

$$A(s) = \frac{1}{\sqrt{2\pi}\,\sigma} \exp\left\{-\frac{(s-ave)^2}{2\sigma^2}\right\} \quad (1)$$

[Math. 2]

$$Pa = (A(0) - A(sd/2))/stp \quad (2)$$

In the case of the initial setting of sd=34, stp=10, and sigma=10 described above, A(0)=0.03989 and A(sd/2)=A(17)=0.00940 are obtained from the formula (1) assuming that the average value ave is zero, and Pa=0.00305 is obtained from the formula (2). These numerical values are each described to be rounded off to five decimal places for the sake of convenience. It should be noted that although sd is expressed within the range of −rn through +(rn−1), and the average value ave is −0.5 instead of 0 in the case in which the size sd of the dot pattern is an even pixel count as explained with reference to FIG. 3B, since it is conceivable that there is hardly a computational problem if the range of −rn through +rn is assumed similarly to the case of the odd pixel count, ave=0 is adopted as described above. For example, in the case of sd=34, the difference in calculation value between the case of considering the actual range of −17 through +16 and the case of considering the range of −17 through +17 is about 0.00005 on the maximum value A(0) side, and about 0.00083 on the minimum value A(17) side, which have no problem in treating them as roughly the same values.

Subsequently, the radius rn (n: 0 through stp−1=9) of each of the levels is calculated (step S160). Specifically, the radius rn fulfilling the formula (3) below is calculated.

[Math. 3]

$$A(0)-(n+1)\cdot Pa = A(rn) \quad (3)$$

In the case of the initial setting of sd=34, stp=10, and sigma=10 described above, the radiuses r0 through r9 of the respective levels are obtained as r0=4 [pixels], r1=6 [pixels], r2=7 [pixels], r3=9 [pixels], r4=10 [pixels], r5=11 [pixels], r6=12 [pixels], r7=14 [pixels], r8=15 [pixels], and r9=17 [pixels].

Then, the regions of the respective levels are specified (step S170). Specifically, defining the center coordinate of the dot pattern as the origin, the regions of the respective levels are specified based on the formula (4) below. Specifically, the circle with the radius rn expressed by the formula (4) forms a boundary between the regions, and the inner area thereof is specified as each of the regions. Therefore, the area between the circle expressed by $(rn-1)^2 = x^2+y^2$ and the circle expressed by $rn^2 = x^2+y^2$ corresponds to the region of the n-th level.

[Math. 4]

$$rn^2 = x^2+y^2 \quad (4)$$

(x: horizontal pixel position, y: vertical pixel position)

Lastly, the gray-scale value (the luminance value) Vn of the luminance of each of the levels is set (step S180). Specifically, for example, it is possible to set the luminance value Vn of each of the levels based on the formula (5) below.

[Math. 5]

$$Vn = V0 - n\cdot(V0/stp) \quad (5)$$

In the case of the initial setting of sd=34, stp=10, and sigma=10 described above, the luminance values V0 through V9 of the respective regions of the first level (the radius r0) through the tenth level (the radius r9) can be obtained as, for example, V1: 88% white, V2: 78% white, V3: 68% white, V4: 58% white, V5: 48% white, V6: 38% white, V7: 28% white, V8: 18% white, and V9: 8% white if V0: 98% white (the proportion to the maximum gray-scale value of 255 in 8 bits) is assumed.

Method of Obtaining Correction Information

Figure 6A:
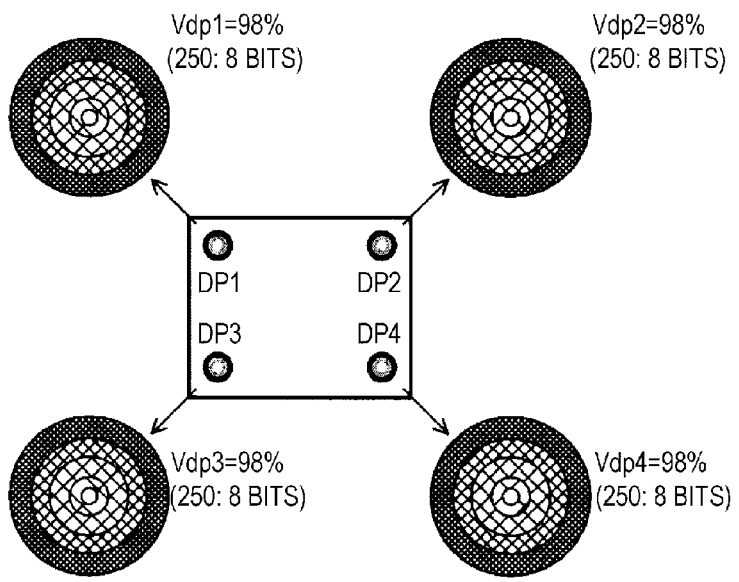
FIG. 6A is an explanatory diagram showing a method of obtaining correction information.
Figure 6B:
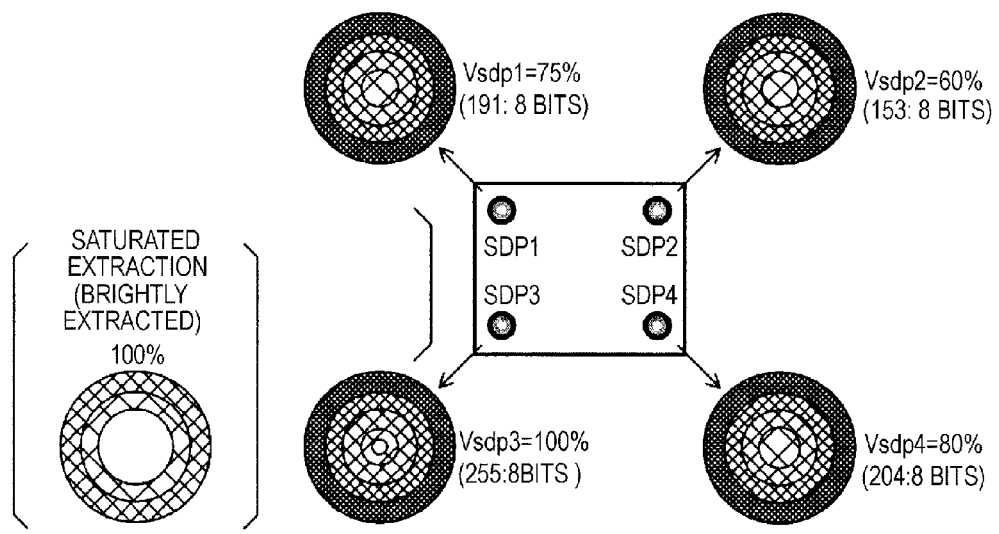
FIG. 6B is an explanatory diagram showing a method of obtaining correction information.
Figure 7A:
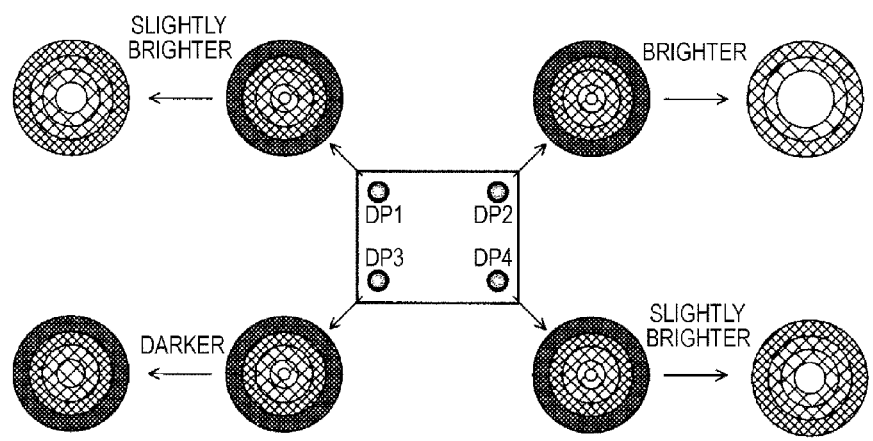
FIG. 7 is an explanatory diagram showing the method of obtaining correction information.
FIG. 7B is an explanatory diagram showing the method of obtaining correction information.
FIG. 7C is an explanatory diagram showing the method of obtaining correction information.
Figure 7B:
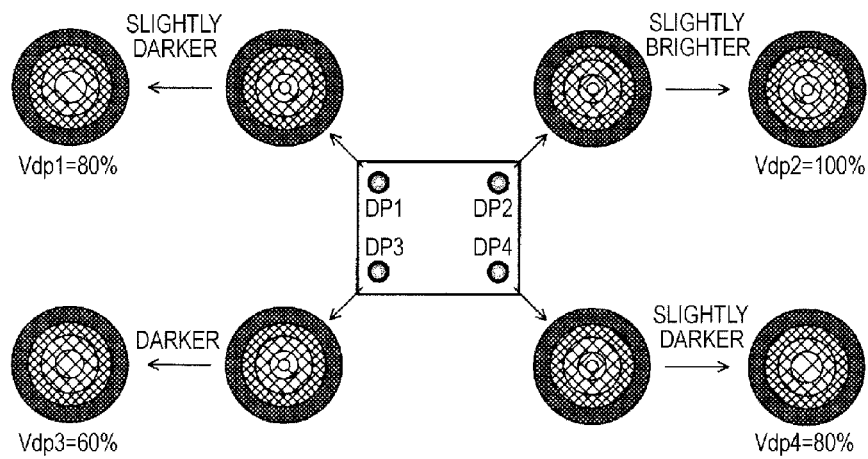

FIGS. 6A, 6B, and 7A through 7C are explanatory diagrams showing the method of obtaining the correction information. FIG. 6A shows the detection image, FIG. 6B shows a imaging result, FIG. 7A shows an example of correction concept, and FIG. 7B shows a specific example of the correction content. It should be noted that the explanation will be presented assuming that the maximum luminance values Vdp1 through Vdp4 of the dot patterns (the detection image parts) DP1 through DP4 are set to 98% (250 in 8 bits) to the maximum settable value of the luminance as shown in FIG. 6A. It should be noted that the maximum luminance value Vdp1 of the dot pattern DP1, for example, is hereinafter also referred to simply as "luminance value Vdp1." Further, in order to make the graphical description simpler, the dot patterns DP1 through DP4 of the detection image shown in FIG. 6A are each shown with the number of levels of the luminance distribution of stp=5, which is lower than stp=10 in the above exemplification. Further, the density of the hatching represents the magnitude relation in luminance value between the levels, and specifically, it is expressed that the higher the density of the hatching is, the lower the luminance value is, and the lower the density of the hatching is, the higher the luminance value is.

It is assumed that the detection image shown in FIG. 6A is projected, and then the detection image parts (the taken detection image parts) SDP1 through SDP4 corresponding to the respective dot patterns DP1 through DP4 are obtained as shown in FIG. 6B. As a result, the luminance value (the maximum luminance value) Vsdp1 of the taken detection image part SDP1 located upper left is 75% (191 in 8 bits), the luminance value Vsdp2 of the taken detection image part SDP2 located upper right is 60% (153 in 8 bits), the luminance value Vsdp3 of the taken detection image part SDP3 located lower left is 100% (255 in 8 bits), and the luminance value Vsdp4 of the taken detection image part SDP4 located lower right is 80% (204 in 8 bits). It should be noted that as shown on the left of the taken detection image part SDP3 located lower left, also in the case of the saturated extraction (brightly extracted), the luminance value is 100% (255 in 8 bits).

Here, in order to accurately obtain the centroid coordinate of each of the taken detection image parts SDP1 through SDP4 corresponding to the respective dot patterns DP1 through DP4 of the detection image, it is preferable that the luminance value (the maximum luminance value) of each of the taken detection image parts SDP1 through SDP4 is equal to or higher than 90% (230 in 8 bits). Further, if the luminance value is 100% (255 in 8 bits), it could be the case of the saturated extraction as described above. Therefore, it is preferable to set the upper limit of the luminance value to around 98% (250 in 8 bits). Therefore, it results that it is sufficient to correct the luminance values Vdp1 through Vdp4 of the respective dot patterns DP1 through DP4 of the detection image so that the luminance values Vsdp1 through Vsdp4 of the four respective taken detection image parts SDP1 through SDP4 fall within a predetermined allowable range (90 through 98% (230 through 250 in 8 bits)), and become roughly equal to each other. It should be noted that the upper limit of the allowable range is not necessarily required to be set to 98% (250 in 8 bits), and if the saturated extraction does not occur, the upper limit can be set to 100% (255 in 8 bits).

Therefore, in the case of, for example, the imaging result shown in FIG. 6B, in order to make the luminance values Vsdp1 through Vsdp4 of the four taken detection image parts SDP1 through SDP4 fall within the allowable range and be roughly equal to each other, the following will work from a simply conceptual viewpoint. That is, it is possible to correct the luminance values Vdp1, Vdp2, and Vdp4 of the dot patterns DP1, DP2, and DP4 located upper left, upper right, and lower right, respectively, into the luminance values increased in accordance with how darkly the dot patterns are extracted, and to correct the luminance value Vdp3 of the dot pattern DP3 located lower left into the luminance value decreased in accordance with how brightly the dot pattern is extracted to thereby make the luminance values Vsdp1 through Vsdp4 of the taken detection image parts SDP1 through SDP4 corresponding respectively to the dot patterns roughly equal to each other.

Here, in the case in which the luminance value Vdp2 of the corresponding taken detection image part SDP2 is as low as 60% as in the case of the dot pattern DP2 located upper right, it results that the correction into the luminance value roughly 1.6 times as high as the luminance value Vdp2 (98%) set originally if following the correction concept described above. However, since the luminance value approximated to roughly 100% is set, it results that the corresponding correction is not achievable by simply raising the setting of the luminance value. Further, in the case in which the luminance value Vsdp3 of the corresponding taken detection image part SDP3 is 100% as in the case of the dot pattern DP3 located lower left, the saturated state is also possible, and there is a possibility that it is not allowable to decrease the value simply in accordance with how the dot pattern is extracted.

Incidentally, since the camera used in the imaging section 50 is generally provided with an exposure adjustment function, the exposure is automatically controlled in accordance with the luminance of the image. Therefore, it is known that even if the luminance value of the taken image without the exposure adjustment is lower than 90% (230 in 8 bits), the luminance value of the taken image is controlled to rise as a whole due to the exposure adjustment. Therefore, it is conceivable that it is possible to perform the correction so that the luminance value of each of the detection image parts (the taken detection image parts) of the taken detection image falls within the allowable range due to the effect of the exposure adjustment providing the luminance values are corrected so as to become roughly equal to each other if the luminance values of the respective taken detection image parts are lower than 90%.

Therefore, in the present embodiment, the following correction is performed. That is, as shown in FIG. 7B, it is possible that, taking the taken detection image part, which is the most darkly extracted, as a reference, the luminance value (the maximum luminance value) of the dot pattern corresponding thereto is set, and the luminance values (the maximum luminance values) of the dot patterns corresponding to the taken detection image parts, which are more brightly extracted than the reference, are set to be darker in accordance with the relationships with the luminance value (the maximum luminance value) of the taken detection image part, which is the most darkly extracted, and thus, the luminance values (the maximum luminance values) of the respective taken detection image parts are made to be roughly equal to each other. Specifically, taking, for example, the dot pattern DP2 corresponding to the taken detection image part SDP2, which is located upper right of FIG. 6B, and is the most darkly extracted, as a reference, the luminance value Vdp2 thereof is corrected into 100% so as to be the brightest. The luminance value Vdp3 of the dot pattern DP3 corresponding to the taken detection image part SDP3, which is located lower left, and is the most brightly extracted, is corrected into 60% so as to be darker than the reference in accordance with the difference between the luminance value Vsdp3 of the taken detection image part SDP3 corresponding thereto and the luminance value Vsdp2 of the taken detection image part SDP2, which is taken as the reference. The luminance valued Vdp1, Vdp4 of the dot patterns DP1, DP4 corresponding to the taken detection image parts SDP1, SDP4, which are located upper left and lower right, respectively, and are extracted with intermediate darkness, are corrected into 80% so as to be slightly darker than the reference in accordance with the differences of the luminance values Vsdp1, Vsdp4 of the taken detection image parts SDP1, SDP4 from the luminance value Vsdp2 of the taken detection image part SDP2, which is taken as the reference. It should be noted that a specific example of a method of obtaining the correction values will be explained below.

Figures 8A, 8B:
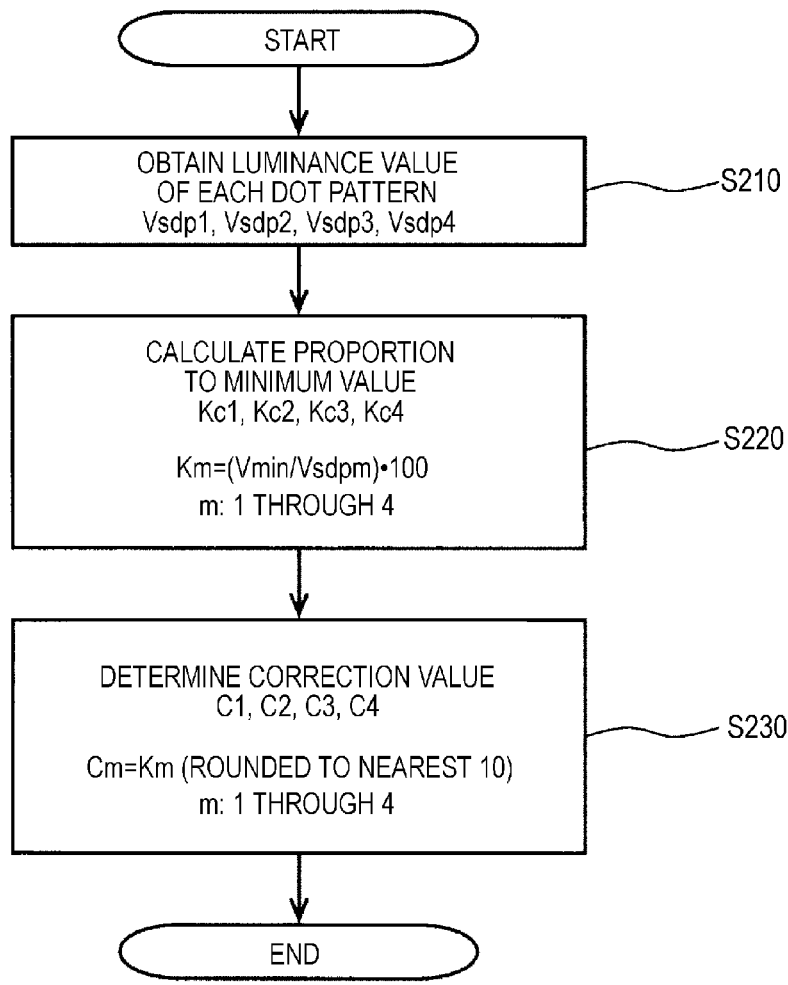
FIG. 8A is an explanatory diagram showing a procedure of obtaining correction values used for the correction of the detection image.
FIG. 8B is an explanatory diagram showing a procedure of obtaining correction values used for the correction of the detection image.

FIGS. 8A and 8B are explanatory diagrams showing a procedure of obtaining correction values used for the correction of the detection image. FIG. 8A shows a flowchart for obtaining the correction values, and FIG. 8B shows a specific example executed with the procedure shown in FIG. 8A in the case in which the imaging result shown in FIG. 6B is obtained. As shown in FIG. 8A, firstly, the luminance values Vsdp1 through Vsdp4 (step S40 in FIG. 2) of the detection image parts (the taken detection image parts) SDP1 through SDP4 corresponding to the respective dot patterns DP1 through DP4 having already been obtained are obtained (step S210). Specifically, for example, Vsdp1=75%, Vsdp2=60%, Vsdp3=100%, and Vsdp4=80% are obtained as shown in FIG. 8B.

Subsequently, using the formula (6) below, the minimum value Vmin of the four luminance values, and the proportions Km (m: 1 through 4) of the respective luminance values are calculated (step S220). Specifically, as shown in FIG. 8B, K1=80%, K2=100%, K3=60%, and K4=75% are obtained.

[Math. 6]

$$Km = (Vmin/Vsdpm) \cdot 100 \quad (m: 1 \sim 4) \qquad (6)$$

Then, by rounding the proportions Km thus obtained to the nearest 10, the correction values Cm (m: 1 through 4) are obtained (step S230). Specifically, as shown in FIG. 8B, C1=80%, C2=100%, C3=60%, and C4=80% are obtained. It should be noted that the process of rounding the proportions to the nearest ten is for reducing the computation load, and can therefore be changed in accordance with the computation load. For example, a process of rounding the proportions off to the nearest whole number can also be adopted.

Figure 7C:
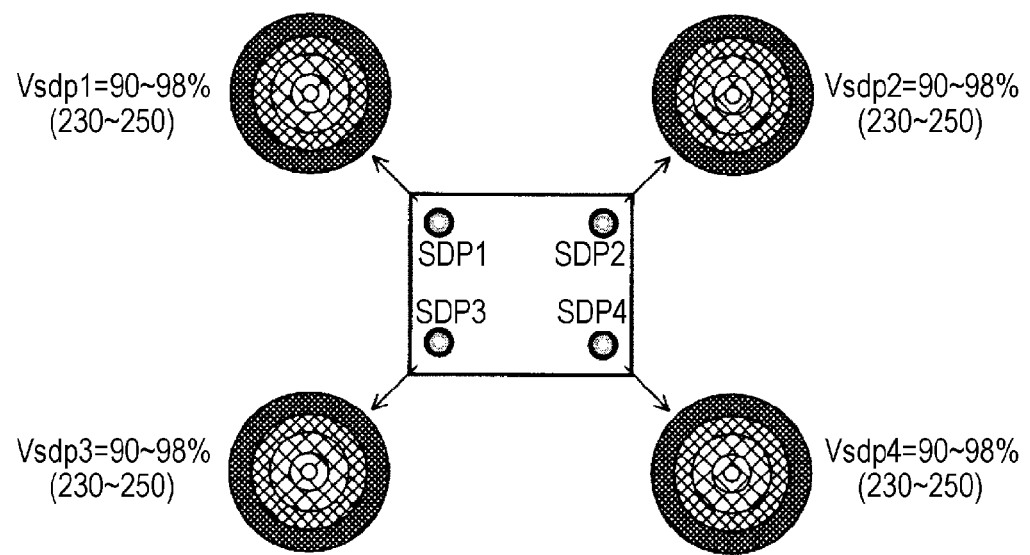

It should be noted that as a result, the detection image generation section 232 performs the correction of the dot patterns based on the correction values (the correction information) obtained in such a manner as described above. In the imaging result corresponding to the detection image thus corrected, the luminance values Vsdp1 through Vsdp4 of the taken detection image parts SDP1 through SDP4 each fall within the allowable range (230 through 250 in 8 bits (90 through 98%)) as shown in FIG. 7C.

As the correction method of the dot patterns, a variety of methods can be adopted. For example, in the case of generating the dot patterns as explained with reference to FIG. 5, it is possible to generate the dot patterns by changing the parameters thereof such as the dot pattern size sd, the number of gray levels stp, the standard deviation sigma, and the luminance value V0 of the center region. If the dot size sd is increased, the range of application of the normal distribution is increased to thereby increase the distribution quantities of the respective levels. Therefore, the maximum luminance value of the taken detection image part tends to be raised. In contrast, if the dot size sd is decreased, the range of application of the normal distribution is decreased to thereby decrease the distribution quantities of the respective levels. Therefore, the maximum luminance value of the taken detection image part tends to be lowered. If the number of gray levels stp is increased, the width of each of the levels is decreased, and therefore, the maximum luminance value of the taken detection image part is decreased. If the number of gray levels stp is decreased, the width of each of the levels is increased, and therefore, the maximum luminance value of the taken detection image part tends to be increased. If the standard deviation sigma is increased, the normal distribution becomes gentler to increase the width of the center region, and thus, the maximum luminance value of the taken detection image part tends to be increased. In contrast, if the standard deviation sigma is decreased, the normal distribution becomes steeper to decrease the width of the center region, and thus, the maximum luminance value of the taken detection image part tends to be decreased. If the luminance value V0 of the center region is increased, the maximum luminance value of the taken detection image part is increased, and if the luminance value V0 of the center region is decreased, the maximum luminance value of the taken detection image part is decreased. Therefore, by appropriately setting the values of these parameters in accordance with the correction values described above to thereby perform the correction of the dot patterns, it becomes possible to correct the dot patterns so that the imaging result with the desired maximum luminance values (the luminance values) can be obtained.

It should be noted that although the taken detection image part with the lowest luminance is taken as the reference in the explanation of the example of obtaining the correction values described above, it is also possible to arrange that the taken detection image part with intermediate luminance or the taken detection image part with the highest luminance is taken as the reference, and the luminance distributions of the dot patterns as the corresponding detection image parts are changed so that the luminance values of the respective taken detection image parts become roughly equal to each other.

Method of Obtaining Centroid Coordinate

Figure 9A:
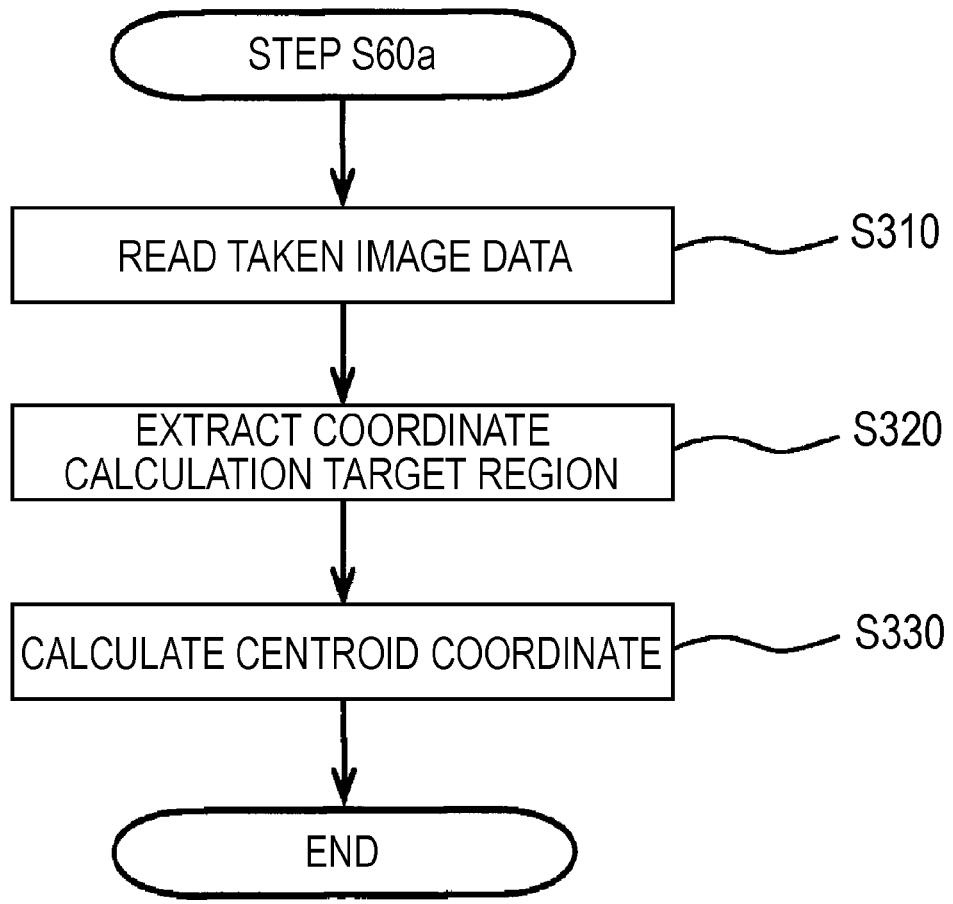
FIG. 9A is an explanatory diagram showing a procedure of obtaining a centroid coordinate in the step S60a shown in FIG. 2.
Figure 9B:
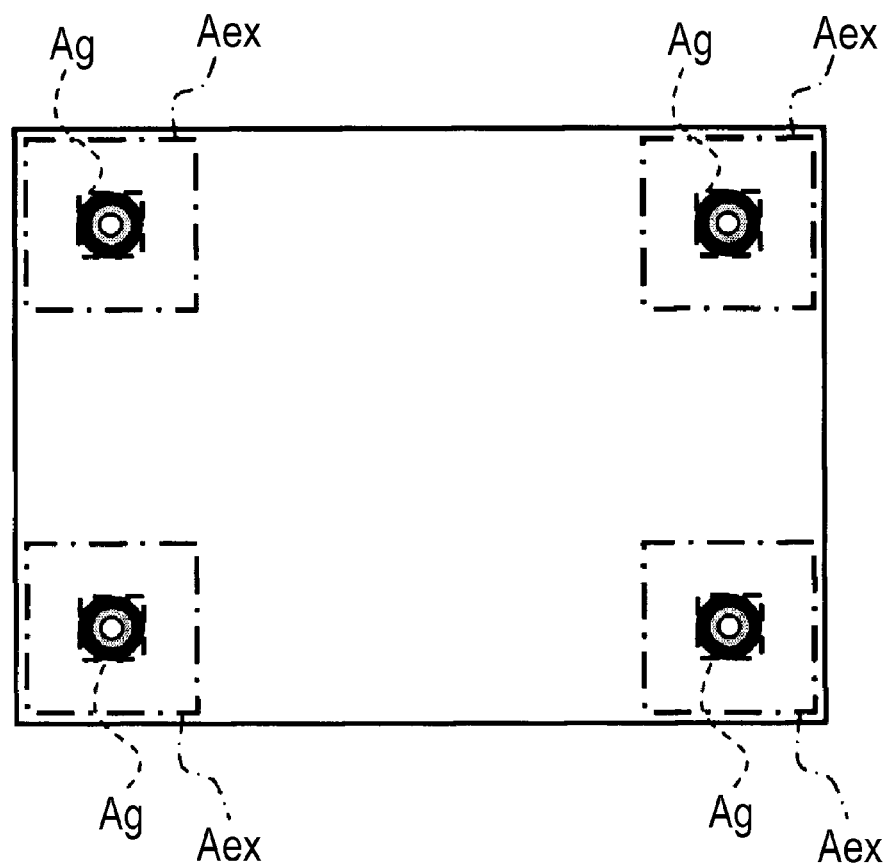
FIG. 9B is an explanatory diagram showing a procedure of obtaining a centroid coordinate in the step S60a shown in FIG. 2.

FIGS. 9A and 9B are explanatory diagrams showing a procedure of obtaining the centroid coordinate in the step S60a shown in FIG. 2. FIG. 9A shows a flowchart of the procedure of obtaining the centroid coordinate, and FIG. 9B shows a target region of the centroid coordinate calculation.

As shown in FIG. 9A, the taken image data is read (step S310), and then extraction of the centroid coordinate calculation target region from the taken image data thus read is performed (step S320). Specifically, the process is performed as described below, for example. Since the dot pattern (the detection image part) constituting the detection image is specified with a coordinate, an approximate area Aex such as an area with a half or quarter width or height from the four corners can be identified even in the taken image represented by the taken image data as shown in FIG. 9B. Therefore, the maximum luminance value in each of the areas Aex is detected. Further, it is possible to extract the minimum area including the corresponding taken detection image part as the centroid coordinate calculation target region Ag based on the coordinate of the maximum value and the dot pattern size. Then, the calculation of the centroid coordinate is performed (step S330) in each of the centroid coordinate calculation target regions Ag thus extracted.

Figures 10, 11:
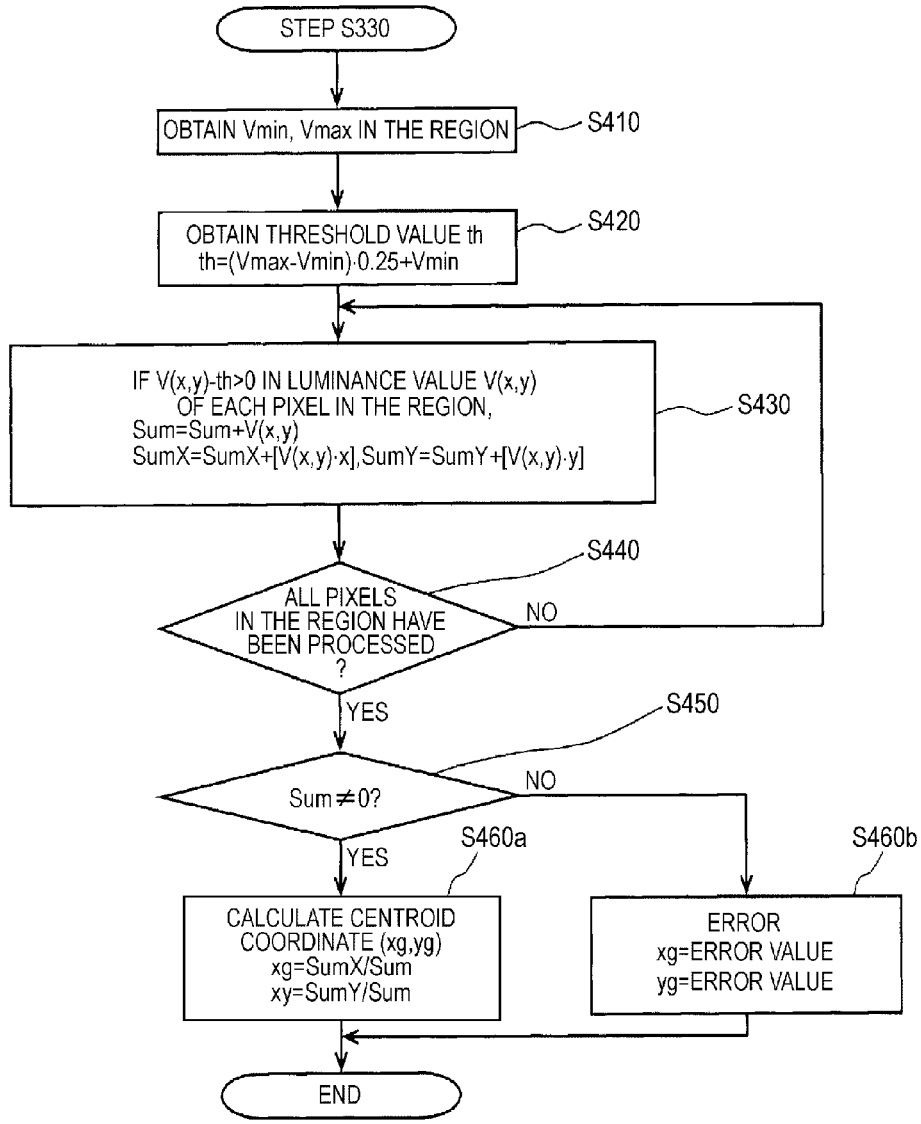
FIG. 10 is a flowchart showing a procedure of centroid coordinate calculation in one centroid coordinate calculation target region.
FIG. 11 is a table showing evaluation results with the detection image correction and evaluation results without the detection image correction in a comparative manner.

FIG. 10 is a flowchart showing a procedure of centroid coordinate calculation in one centroid coordinate calculation target region. Firstly, the taken image data in the centroid coordinate calculation target region Ag is investigated to obtain (step S410) the maximum value Vmax and the minimum value Vmin of the luminance in the region. Further, the threshold value th is obtained (step S420) using the formula (7) below.

[Math. 7]

$$th = (V\max - V\min) \cdot 0.25 + V\min \quad (7)$$

It should be noted that the formula (7) shows that the value, which is 25% of the difference (Vmax−Vmin) greater than the minimum value Vmin of the luminance in the centroid coordinate calculation target region Ag, is set to the threshold value. It should be noted that the value of percentage of the difference (Vmax−Vmin) is not limited to 25%, but can arbitrarily be set in accordance with what is the value set to the minimum luminance of the pixel to be the centroid coordinate calculation target in the centroid coordinate calculation target region Ag.

Then, the comparison between the luminance value V(x, y) of each of the pixels of the centroid coordinate calculation target region Ag and the threshold value th is performed, and if V(x, y)−th>0 is fulfilled, it is determined that the pixel is included in the target of the centroid coordinate calculation, and the accumulating operations expressed in the formulas (8) through (10) below are performed (step S430). The formula (8) means that the luminance values of the pixels determined to be the target of the centroid coordinate calculation are accumulated. The formula (9) means that the product of the x-coordinate value and the luminance value of the pixel determined to be the target of the centroid coordinate calculation is accumulated. The formula (10) means that the product of the y-coordinate value and the luminance value of the pixel determined to be the target of the centroid coordinate calculation is accumulated. It should be noted that the process is repeated (step S440) until the process is performed on all of the pixels in the centroid coordinate calculation target region Ag.

[Math. 8]

$$\text{Sum} = \text{Sum} + V(x,y) \quad (8)$$

[Math. 9]

$$\text{Sum}X = \text{Sum}X + [V(x,y) \cdot x] \quad (9)$$

[Math. 10]

$$\text{Sum}Y = \text{Sum}Y + [V(x,y) \cdot y] \quad (10)$$

Then, if the process of the step S430 has been performed on all of the pixels in the centroid coordinate calculation target region Ag (YES in the step S440), whether or not the value of the parameter Sum is 0 is determined (step S450). If the value of the parameter Sum is 0 (NO in the step S450), it is determined that an error occurs in the calculation of the centroid coordinate (xg, yg), and an error value determined in advance is set as the centroid coordinate (xg, yg). It should be noted that in this case it is also possible to arrange that the flow of obtaining the centroid coordinate shown in FIG. 9A is resumed to thereby achieve reduction of the rate of occurrence of the error. In contrast, if the value of the parameter Sum is not equal to 0 (NO in the step S450), the centroid coordinate (xg, yg) is obtained with the formulas (11), (12) below.

[Math. 11]

$$xg = \text{Sum}X / \text{Sum} \quad (11)$$

[Math. 12]

$$yg = \text{Sum}Y / \text{Sum} \quad (12)$$

It should be noted that the formula (11) means that the x-coordinate value of the centroid is obtained by dividing the integrated value of the product of the x-coordinate value and the luminance value of each of the pixels determined to be the target of the centroid coordinate calculation by the integrated value of the luminance value of each of the pixels determined to be the target of the centroid coordinate calculation. Similarly, the formula (12) means that the y-coordinate value of the centroid is obtained by dividing the integrated value of the product of the y-coordinate value and the luminance value of each of the pixels determined to be the target of the centroid coordinate calculation by the integrated value of the luminance value of each of the pixels determined to be the target of the centroid coordinate calculation.

Detection Image Correction Effect

The effect of the detection image correction explained with reference to FIGS. 2, 3A, 3B, 4A, 4B, 5, 6A, 6B, 7A through 7C, 8A, and 8B is confirmed. Specifically, in the case in which the projector PJ (FIG. 1) according to the present embodiment is installed in front of the screen SC with the projection distance therebetween set to 70 cm, the focus adjustment is performed, and then the projection distance is changed to 300 cm to create the defocused condition, the centroid coordinate calculated in the case of not correcting the detection image, and the centroid coordinate calculated in the case of correcting the detection image are evaluated. It should be noted that the dot patterns of the detection image before the correction are generated assuming that the dot pattern size sd is 34 [pixels], the number of set gray levels stp is 10 [levels], the standard deviation sigma is 10 [pixels], and the luminance value V0 of the center region is 250 (98%) in 8 bits, similarly to the case exemplified in the explanation of FIG. 5.

Figure 12:
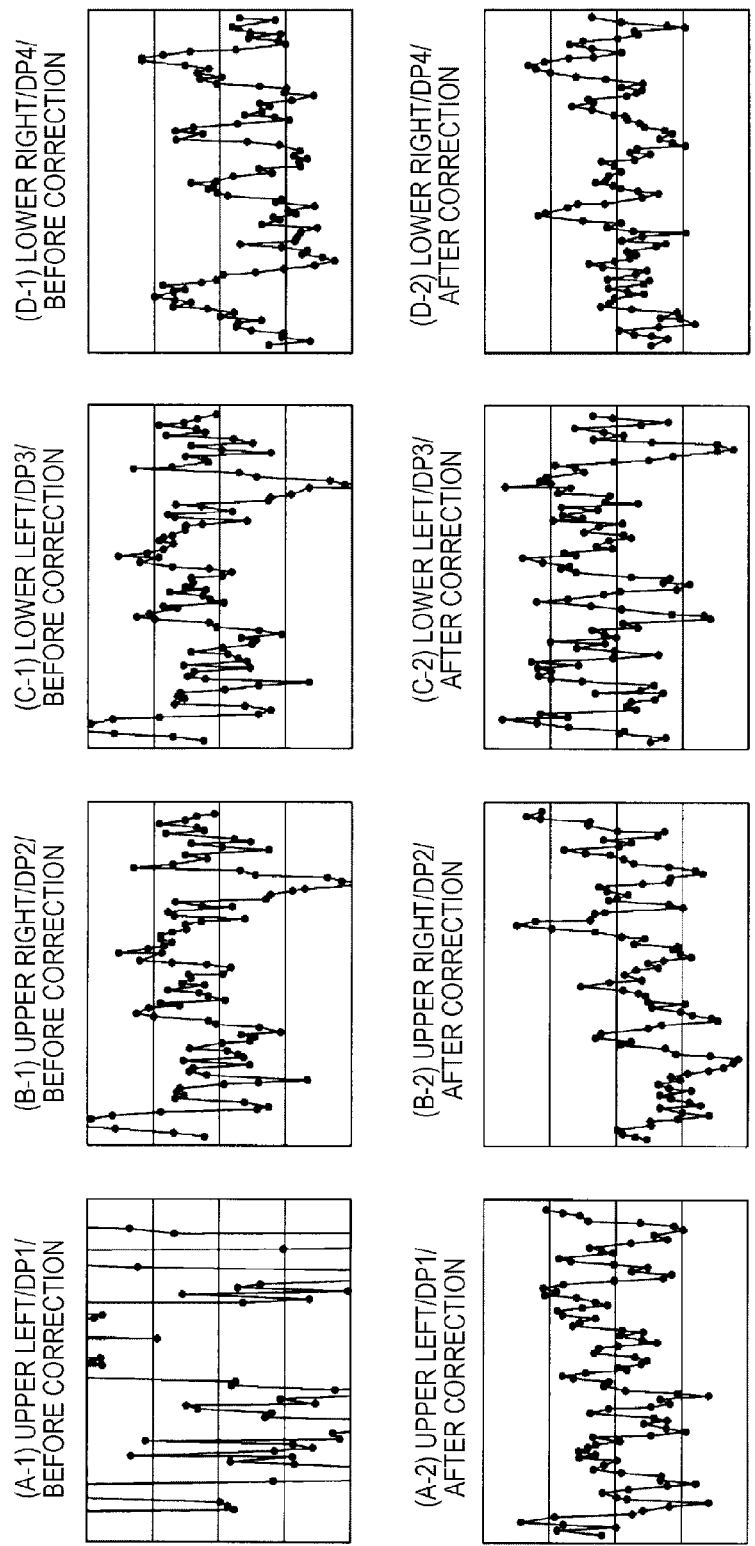
FIG. 12 illustrates a plurality of graphs, each showing a variation in the centroid coordinate over a plurality of times of measurement for the results with the detection image correction and without the detection image correction, arranged in a comparative manner.

FIG. 11 is a table showing the evaluation results with the detection image correction and the evaluation results without the detection image correction in a comparative manner. FIG. 12 is a plurality of graphs, each showing a variation in the centroid coordinate over a plurality of times of measurement for the results with the detection image correction and without the detection image correction, arranged in a comparative manner. As shown in FIG. 11, there is obtained a result that the luminance values (the maximum luminance values) of the taken detection image parts corresponding to the respective dot patterns DP1 through DP4 of the detection image before the correction are 65%, 77%, 87%, and 100%, respectively. It should be noted that the result shows a representative example obtained over a plurality of times (e.g., 100 times) of measurement. Then, the dot patterns are corrected by setting the value of the standard deviation sigma to sigma=9 in the dot pattern DP1 located upper left and the dot pattern DP3 located lower left, and to sigma=8 in the dot pattern DP2 located upper right and the dot pattern DP4 located lower right based on the result described above. As a result, as shown in FIG. 11, there is obtained a result that the luminance values of the taken detection image parts corresponding to the respective dot patterns DP1 through DP4 of the detection image after the correction are 100%, 92%, 100%, and 90%, respectively. It should be noted that the result also shows a representative example.

Further, as shown in FIG. 12, the variation in the centroid coordinate obtained by performing the imaging and then measuring the image a plurality of times (here, 100 times) can be reduced compared to the case before the correction. In particular, as is obvious from the result of the dot pattern DP1 located upper left with the remarkably low proportion of the luminance value before the correction, it is understood that the proportion is dramatically improved, and the difference in variation between the four dot patterns is reduced. Similarly, as is obvious from the result of the dot pattern DP1 located upper left with the remarkably low proportion of the luminance value, it is understood that the sum of the shift amount of the centroid coordinate and the standard deviation sigma of the centroid coordinate measured in FIG. 11 are also dramatically improved, and the difference in variation between the four dot patterns is reduced.

It can be confirmed that by performing the correction so that the luminance values of the taken detection image parts corresponding to the respective dot patterns fall within the allowable range, and become roughly equal to each other as described above, the extraction accuracy of the centroid coordinate in each of the points is improved.

As explained hereinabove, in the projector according to the present embodiment, by correcting the detection image so that the luminance values of the detection image parts (the taken detection image parts) in the taken image corresponding to the dot patterns as the detection image parts of the detection image fall within the allowable range and become roughly equal to each other, the detection accuracy of the detection image can be improved. Further, even in the state in which the focus adjustment is not performed to thereby cause defocus, or the state in which the keystone correction is not performed to thereby cause a distortion in the projection image, the detection accuracy of the detection image can similarly be improved. As a result, it becomes possible to perform a variety of adjustments such as the focus adjustment and the keystone correction with good accuracy using the detection image extracted with accuracy.

C. Modified Examples

It should be noted that the invention is not limited to the embodiment described above, but can be put into practice in various forms within the scope of the invention.

1. First Modified Example

In the embodiment described above, the explanation is presented citing the case as an example in which the difference in probability density between the levels is set to have a constant interval using the allocation value determined using the normal distribution function as shown in FIG. 5, and at the same time the luminance values of the respective levels are set so that the ratios between the luminance values decrease at regular intervals in the generation of the dot patterns as the detection image parts. However, the invention is not limited thereto, but it is also possible to use a linear function with a broken line shape, a quadratic function, or the like instead of the normal distribution function. Further, it is possible to set the luminance values of the respective levels so that the gray-scale values decrease at regular intervals instead of the ratios between the luminance values with the regular intervals, and the regular intervals in the gray-scale values or the ratios are not necessarily required.

Further, although in the embodiment described above, the case of changing the standard deviation sigma is explained as an example of the correction of the dot patterns, it is also possible to arrange that the correction is performed by changing a variety of parameters such as the dot pattern size, the number of gray levels, or the luminance value of the center region as explained in the description of the embodiment.

As described above, the generation and the correction of the detection image parts as the dot patterns can be performed using any method providing the detection image parts each including a plurality of regions having the respective luminance values different form each other can be generated and corrected.

2. Second Modified Example

As shown in FIG. 3A, in the embodiment described above, the explanation is presented citing the detection image having the four dot patterns disposed at the four corners of the image as the detection image parts as an example. However, the invention is not limited thereto, but a variety of detection images can be used. Hereinafter, some other detection images will be cited.

Figure 13A:
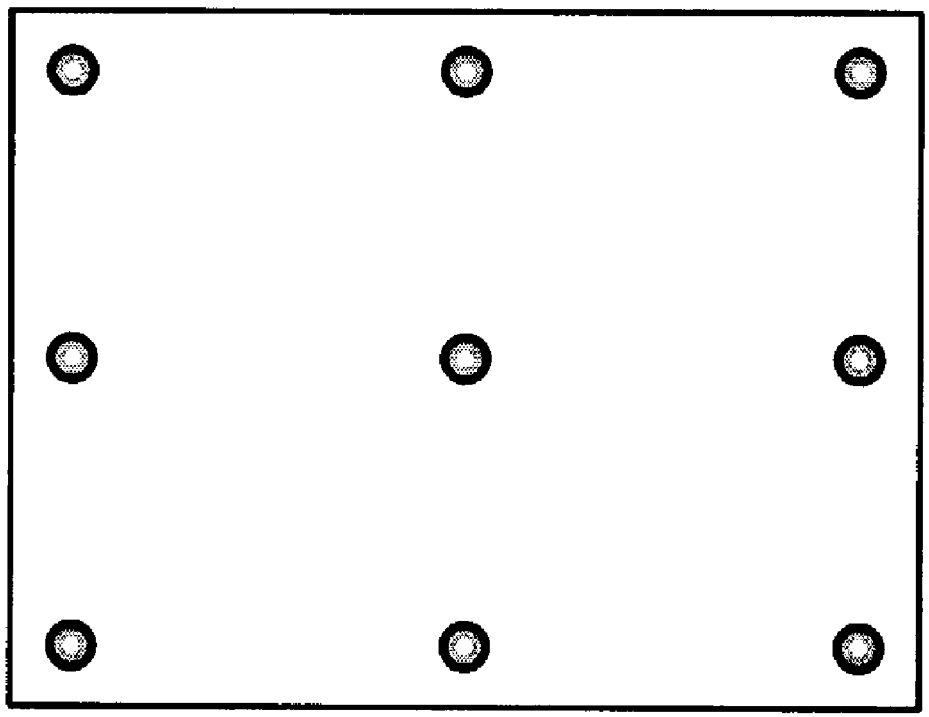
FIG. 13A is an explanatory diagram each showing an example of another detection image using dot patterns.
Figure 13B:
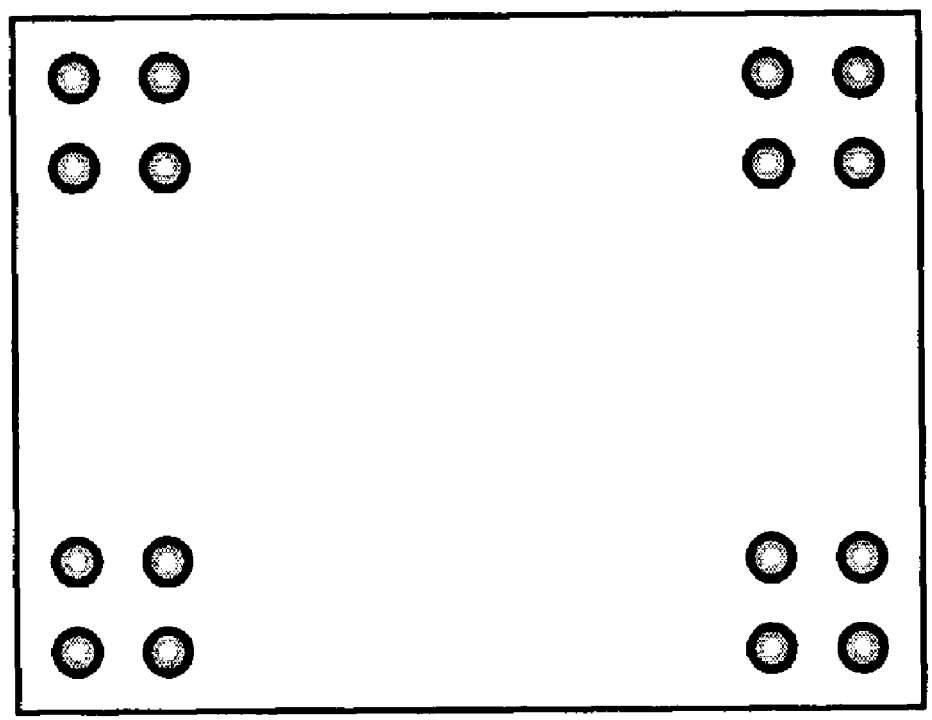
FIG. 13B is an explanatory diagram each showing an example of another detection image using dot patterns.

FIGS. 13A and 13B are explanatory diagrams each showing an example of another detection image using the dot patterns. FIG. 13A shows an example having nine dot patterns disposed in a grid. FIG. 13B shows an example in which four blocks each including four dot patterns are disposed in the four corners of the image, wherein each of the blocks is composed of four dot patterns arranged at vertexes of a square. Such detection images having the dot patterns as the detection image parts variously changed in the number, the arrangement, and so on as described above can also be used.

Figure 14:
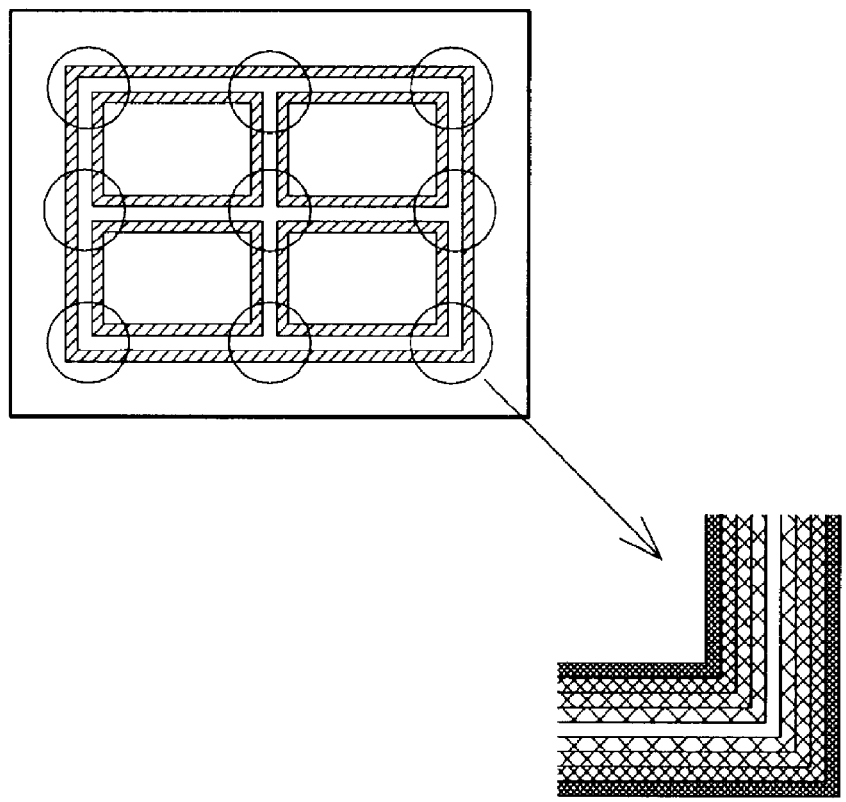
FIG. 14 is an explanatory diagram showing another example of the detection image.

FIG. 14 is an explanatory diagram showing an example of the detection image including other detection image parts different from the dot pattern. FIG. 14 shows an example of a line image shaped like a grid. The line image is sectioned into a plurality of regions having respective luminance values different from each other arranged so that the center region of the line has a higher luminance value and the outer region of the line has a lower luminance value. In the case of the detection image, it is possible to use the parts indicated by the circular frames as the detection image parts. The correction can be performed by varying the width of the line, the number of gray levels, the width of each level, the setting values of the luminance of the center region, and so on. As described above, the detection image part is not limited to the dot pattern, but a variety of detection images can be used providing the detection image has a plurality of detection image parts each having a plurality of regions with respective luminance values different from each other.

3. Third Modified Example

Figure 15:
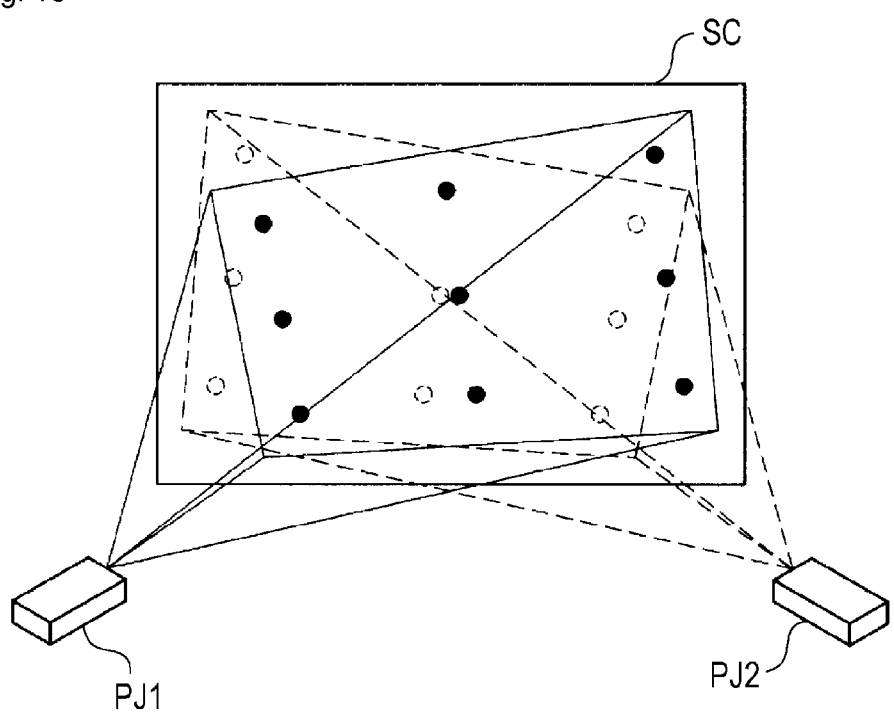
FIG. 15 is an explanatory diagram showing a configuration of displaying images on a projection surface in a superimposed manner using a plurality of projectors.

FIG. 15 is an explanatory diagram showing a configuration of displaying images on a projection surface in a superimposed manner using a plurality of projectors. It should be noted that FIG. 15 shows the case in which the projection images from two projectors PJ1, PJ2 are superimposed on the screen SC as the projection surface, and thus a single image is displayed as an example. The configuration of each of the two projectors PJ1, PJ2 is substantially the same as in the embodiment.

In the case of displaying one image by superimposing the projection images from a plurality of projectors, in order to display the images while accurately superimposing them on each other, it is important to extract the detection images with good accuracy, and to accurately obtain the centroid coordinate of each of the taken detection image parts corresponding to the detection image parts of the detection image. In the example shown in FIG. 15, since the two projectors PJ1, PJ2 each having substantially the same configuration as that of the projector PJ explained in the description of the embodiment are used, it becomes possible to accurately extract the detection image in each of the projectors to thereby accurately obtain the centroid coordinate of the taken detection image parts corresponding to the detection image parts of the detection image as explained in the description of the embodiment. Thus, it is possible to improve the accuracy of the superimposition of the images.

It should be noted that it is also possible to make the detection image different between the first projector PJ1 and the second projector PJ2. According to this configuration, the detection images projected on the screen SC can easily be separated, and thus the extraction of the detection image in each of the projectors becomes easy. In order to make the detection image different, there can be cited a variety of methods such as change in the layout or the number of the dot patterns, or change in the pattern itself of the detection image between the dot pattern shown in FIGS. 3A, 13A, and 13B and the pattern shown in FIG. 14. Further, the invention is not limited to two projectors, but is advantageous in the case of displaying one image by superimposing the projection images from a plurality of projectors.

4. Fourth Modified Example

The method for obtaining the correction values explained with reference to FIGS. 6A, 6B, 7A through 7C, 8A, and 8B, and the formula used therefor in the embodiment described above are illustrative only, but the invention is not limited thereto. Any method and formula can be used providing the luminance values of the respective detection image parts (the taken detection image parts) of the taken image fall within the allowable range and become roughly equal to each other using the method and the formula.

5. Fifth Modified Example

In the embodiment described above, the calculation of the centroid coordinate is not necessarily limited to those using the formulas (11) and (12), but a variety of calculation methods of the centroid coordinate can be used. For example, it is also possible to adopt the average value of the coordinates of the pixels each having a greater luminance value than the threshold value th. Further, it is also possible to adopt the average value of the coordinates of the pixels located in the centroid coordinate calculation target region Ag.

6. Sixth Modified Example

In the embodiment described above, it is assumed that the detection image adjustment is started in response to the instruction issued by the user operating the input operation section 10. However, the invention is not limited thereto, but the detection image adjustment can be started at various timings. For example, it is possible to start the detection image adjustment automatically when starting up the projector. Further, it is also possible to arrange that the detection image adjustment is started automatically in response to the motion detection section 60 detecting the transition of the state of the projector from a resting state to a moving state.

7. Seventh Modified Example

Although the explanation is presented assuming that the process is terminated after obtaining the centroid coordinate of each of the detection image parts in the detection image adjustment process (FIG. 2) of the embodiment described above, it is also possible to arrange that, for example, the process keeps the standby state until the termination instruction from the user is issued, and performs the adjustment of the detection image once again if it is determined in the standby state that the readjustment of the detection image is necessary due to the fact that the motion detection section detects the motion of the projector is detected and the change in the installation state is detected, or the fact that the setting condition of the projector is changed. It should be noted that it is also possible to arrange that the process is terminated if the readjustment of the detection image fails to become necessary for a predetermined period of time instead of the termination instruction from the user.

8. Eighth Modified Example

In the embodiment described above, the explanation is presented citing the case of providing the projector with the imaging section an example. However, it is also possible to arrange that the imaging section is provided separately from the projector. Also in this case, the detection image can be corrected in accordance with the image taken by the imaging section provided separately from the projector. Thus, it becomes possible to extract the detection image with accuracy to thereby accurately obtain the centroid coordinate of each of the taken detection image parts corresponding to the detection image parts of the detection image. Thus, it is possible to improve the accuracy of the superimposition of the images.

9. Ninth Modified Example

In the embodiment described above, the projector PJ converts the light from the illumination optical system 420 into the image light using the liquid crystal light valve 440, which uses the transmissive liquid crystal panel, as the light modulation device. However, it is also possible to use a digital micro-mirror device (DMD), a reflective liquid crystal panel, or the like as the light modulation device.

REFERENCE SIGNS LIST 10 input operation section
20 control circuit
30 image processing operation circuit
40 image projection optical system
50 imaging section
220 Control section
230 detection image adjustment section
232 detection image generation section
234 imaging control section
236 image analysis section
238 centroid coordinate detection section
260 information storage section
262 setting information storage section
264 detection image information storage section
266 taken image information storage section
320 input processing section
340 image display processing section
360 image memory
380 light valve drive section
420 illumination optical system
422 light source lamp
424 lamp drive section
440 liquid crystal light valve
460 projection optical system
462 projection lens
464 lens drive section
466 state detection section
PJ projector
PJ1, PJ2 projector
TP, TPa detection image PP image
DP dot pattern
DP1 through DP4 dot pattern (detection image part)
SDP1 through SDP4 taken detection image part
SC screen (projection surface)

The invention claimed is:

1. An image processing device used for a projector adapted to display an image formed from image data by projecting the image on a projection surface comprising:
a detection image generation section adapted to generate a detection image which is different from the image formed from the image data, the detection image being an image adapted to detect a state of a projection image displayed on the projection surface, the detection image including a plurality of detection image parts, and the projection image being an image obtained by superimposing the detection image on the image formed from the image data,
wherein each of the detection image parts includes a plurality of regions having respective luminance values different from each other, and
the detection image generation section changes a luminance distribution of each of the detection image parts of the detection image to be generated so that maximum luminance values of the detection image parts included in a taken detection image obtained by taking the detection image projected on the projection surface fall within an allowable range.

2. The image processing device according to claim 1, wherein
the detection image generation section takes the luminance value of either one of the taken detection image parts out of the detection image parts included in the taken detection image as a reference luminance value, and changes the luminance distribution of each of the detection image parts of the detection image to be generated so that the maximum luminance values of the detection image parts included in the taken detection image are roughly equal to each other based on a relationship between the reference luminance value and luminance values of other detection image parts.

3. The image processing device according to claim 1, wherein
the detection image generation section changes the luminance distribution of each of the detection image parts of the detection image to be generated by changing at least one of an overall size of the detection image part included in the detection image,
a width of each of the regions included in the detection image part, and
the maximum luminance value of the detection image part.

4. The image processing device according to claim 1, wherein
sectioning of the regions is obtained based on a predetermined function.

5. The image processing device according to claim 4, wherein
the function is a Gaussian distribution function.

6. The image processing device according to claim 1, further comprising:
a projection image adjustment section adapted to adjust image quality of the projection image,
wherein the projection image adjustment section performs at least one of a plurality of image quality adjustments including a focus adjustment and a keystone distortion correction of the projection image based on the process using the detection image.

7. The image processing device according to claim 1, wherein
the detection image generation section changes the luminance distribution of the detection image parts of the detection image without changing the image data.

8. A projector adapted to display an image by projecting the image on a projection surface, comprising:
the image processing device according to claim 1;
an imaging section adapted to take the detection image projected on the projection surface; and
a projection section adapted to project the image based on image data output from the image processing device.

9. A method of controlling a projector adapted to display an image formed from image data by projecting the image on a projection surface, the method comprising:
(a) generating a detection image which is different from the image formed from the image data, the detection image being an image adapted to detect a state of a projection image displayed on the projection surface, the detection image including a plurality of detection image parts; and
(b) projecting the detection image on the projection surface such that the projection image is an image obtained by superimposing the detection image on the image formed from the image data,
wherein each of the detection image parts includes a plurality of regions having respective luminance values different from each other, and
in step (a), a luminance distribution of each of the detection image parts of the detection image to be generated is changed so that maximum luminance values of the detection image parts included in a taken detection image obtained by taking the detection image projected on the projection surface fall within an allowable range.

10. The method according to claim 9, wherein
in step (a), the luminance distribution of each of the detection image parts is changed without changing the image data.

* * * * *